(12) United States Patent
Li et al.

(10) Patent No.: US 12,084,211 B2
(45) Date of Patent: Sep. 10, 2024

(54) AUTOMATIC RECYCLING AND CHARGING NEST FOR VERTICAL TAKE-OFF AND LANDING UNMANNED AERIAL VEHICLE

(71) Applicant: XI'AN LYNCON TECHNOLOGY CO., LTD., Shaanxi (CN)

(72) Inventors: Jing Li, Shaanxi (CN); Liangping Wang, Shaanxi (CN); Zhihua Gao, Shaanxi (CN); Huanfei Zhang, Shaanxi (CN); Pengfei Jiao, Shaanxi (CN); Fan Liu, Shaanxi (CN); Xudong Cai, Shaanxi (CN); Dongru Fang, Shaanxi (CN)

(73) Assignee: XI'AN LYNCON TECHNOLOGY CO., LTD., Shaanxi (CN)

( * ) Notice: Subject to any disclaimer, the term of this patent is extended or adjusted under 35 U.S.C. 154(b) by 0 days.

(21) Appl. No.: 17/623,589

(22) PCT Filed: Nov. 23, 2021

(86) PCT No.: PCT/CN2021/132534
§ 371 (c)(1),
(2) Date: Dec. 28, 2021

(87) PCT Pub. No.: WO2023/279630
PCT Pub. Date: Jan. 12, 2023

(65) Prior Publication Data
US 2024/0239533 A1    Jul. 18, 2024

(30) Foreign Application Priority Data

Jul. 8, 2021 (CN) .......................... 202110771646.X

(51) Int. Cl.
*B64U 70/99* (2023.01)
*B64U 10/20* (2023.01)
*B64U 50/37* (2023.01)

(52) U.S. Cl.
CPC ............. *B64U 70/99* (2023.01); *B64U 10/20* (2023.01); *B64U 50/37* (2023.01)

(58) Field of Classification Search
CPC ........ B64U 70/99; B64U 10/20; B64U 50/37; B64U 70/97; B64U 80/25; B64U 80/60; B64F 1/007; B64F 1/222
See application file for complete search history.

(56) References Cited

U.S. PATENT DOCUMENTS 2,395,528 A * 2/1946 Andersen .................. B64F 1/24
                                                              104/44
3,035,528 A * 5/1962 Bolton ...................... B64F 1/24
                                                              104/44

(Continued)

FOREIGN PATENT DOCUMENTS

CN      209617534 U    11/2019
CN      111776237 A    10/2020

(Continued)

*Primary Examiner* — Medhat Badawi
(74) *Attorney, Agent, or Firm* — Samson G. Yu

(57) ABSTRACT

The embodiments of the disclosure discloses an automatic recycling and charging nest for a vertical take-off and landing unmanned aerial vehicle, including a cabin body and an openable and closable top cover installed on the top of the cabin body, wherein an inner cabin is further installed in the cabin body, the height of the inner cabin is the same as that of the cabin body, a rotating mechanism is further arranged inside the inner cabin, a clamping and centering device is installed on the top of the inner cabin, and a locking and charging device is further installed on the clamping and centering device; and the locking and charging device includes a base connected with the clamping and centering device, and a pneumatic hydraulic clamp for charging connected to the base.

7 Claims, 13 Drawing Sheets

(56) References Cited

U.S. PATENT DOCUMENTS

| | | | | |
|---|---|---|---|---|
| 5,988,564 | A * | 11/1999 | Lee | B64F 1/24 244/116 |
| 9,302,783 | B2 * | 4/2016 | Wang | B60R 9/00 |
| 9,387,928 | B1 * | 7/2016 | Gentry | G08G 5/0039 |
| 9,387,940 | B2 * | 7/2016 | Godzdanker | B64F 1/12 |
| 9,460,616 | B1 * | 10/2016 | Miyahira | G08G 1/0967 |
| 9,576,482 | B2 * | 2/2017 | Yamamoto | H04W 4/027 |
| 9,637,233 | B2 * | 5/2017 | Bivens | A01K 15/00 |
| 9,880,563 | B2 * | 1/2018 | Fisher | G08G 5/0078 |
| 9,928,749 | B2 * | 3/2018 | Gil | H04W 4/70 |
| 10,182,215 | B1 * | 1/2019 | Jacob | B60F 5/02 |
| 10,207,820 | B2 * | 2/2019 | Sullivan | B64U 70/99 |
| 10,239,638 | B1 * | 3/2019 | Cohen | B64F 1/027 |
| 10,274,952 | B2 * | 4/2019 | Cantrell | G05D 1/0094 |
| 10,457,421 | B2 * | 10/2019 | O'Toole | B64F 1/32 |
| 10,543,984 | B1 * | 1/2020 | Alduaiji | G06Q 10/08 |
| 10,577,099 | B2 * | 3/2020 | Akens | B64U 10/14 |
| 10,934,019 | B2 * | 3/2021 | Stamatovski | B64C 39/024 |
| 11,046,459 | B2 * | 6/2021 | Stamatovski | B64F 1/24 |
| 11,180,263 | B2 * | 11/2021 | Ratajczak | B60L 53/14 |
| 11,220,352 | B2 * | 1/2022 | Stamatovski | B64F 1/007 |
| 11,440,679 | B2 * | 9/2022 | Cowden | B64U 80/30 |
| 11,667,402 | B2 * | 6/2023 | Liske | B64F 1/322 244/116 |
| 11,673,690 | B2 * | 6/2023 | Dayan | B64U 10/60 244/114 R |
| 11,939,080 | B2 * | 3/2024 | Cowden | B64U 80/30 |
| 2015/0069968 | A1 * | 3/2015 | Pounds | B60L 53/35 320/109 |
| 2015/0158599 | A1 * | 6/2015 | Sisko | B64F 1/20 244/114 R |
| 2015/0183528 | A1 * | 7/2015 | Walsh | A47G 29/141 244/114 R |
| 2016/0011592 | A1 * | 1/2016 | Zhang | B64C 39/024 244/114 R |
| 2016/0039300 | A1 * | 2/2016 | Wang | B64U 50/39 244/58 |
| 2016/0039541 | A1 * | 2/2016 | Beardsley | B64F 1/362 701/2 |
| 2016/0093218 | A1 * | 3/2016 | Hale | G08G 5/0091 701/120 |
| 2016/0101855 | A1 * | 4/2016 | Stefani | G08G 5/0008 701/2 |
| 2016/0101874 | A1 * | 4/2016 | McKinnon | A47G 29/14 244/114 R |
| 2016/0130000 | A1 * | 5/2016 | Rimanelli | B64U 10/70 244/2 |
| 2016/0137293 | A1 * | 5/2016 | Santangelo | B64U 60/60 244/50 |
| 2016/0137304 | A1 * | 5/2016 | Phan | B64F 3/02 244/17.23 |
| 2016/0144982 | A1 * | 5/2016 | Sugumaran | B64F 1/12 244/108 |
| 2016/0185466 | A1 * | 6/2016 | Dreano, Jr. | A47G 29/141 705/26.81 |
| 2016/0196756 | A1 * | 7/2016 | Prakash | G06Q 10/083 701/3 |
| 2016/0229299 | A1 * | 8/2016 | Streett | B60L 53/12 |
| 2016/0244162 | A1 * | 8/2016 | Weller | B64C 39/024 |
| 2016/0257424 | A1 * | 9/2016 | Stabler | B64F 1/20 |
| 2016/0257426 | A1 * | 9/2016 | Mozer | B64U 70/99 |
| 2016/0311329 | A1 * | 10/2016 | Rodriguez | H02J 7/00 |
| 2016/0364989 | A1 * | 12/2016 | Speasl | G08G 5/0069 |
| 2017/0015415 | A1 * | 1/2017 | Chan | B60L 53/665 |
| 2017/0023949 | A1 * | 1/2017 | Fisher | B64D 47/08 |
| 2017/0050749 | A1 * | 2/2017 | Pilskalns | B64F 1/12 |
| 2017/0073084 | A1 * | 3/2017 | Mozer | B64U 80/25 |
| 2017/0096222 | A1 * | 4/2017 | Spinelli | B64C 39/024 |
| 2017/0121023 | A1 * | 5/2017 | High | B64D 9/00 |
| 2017/0129603 | A1 * | 5/2017 | Raptopoulos | B64C 39/024 |
| 2017/0144776 | A1 * | 5/2017 | Fisher | B64F 1/24 |
| 2017/0240062 | A1 * | 8/2017 | Jaiswal | B64U 70/95 |
| 2017/0253349 | A1 * | 9/2017 | Wang | B64U 70/97 |
| 2017/0313422 | A1 * | 11/2017 | Gil | G06Q 10/0832 |
| 2017/0344000 | A1 * | 11/2017 | Krishnamoorthy | B64F 1/35 |
| 2018/0118340 | A1 * | 5/2018 | Russo | A01K 59/00 |
| 2018/0141680 | A1 * | 5/2018 | Heinonen | B60L 53/14 |
| 2018/0148170 | A1 * | 5/2018 | Stamatovski | B64F 1/18 |
| 2018/0178665 | A1 * | 6/2018 | Chen | B64U 50/37 |
| 2018/0229852 | A1 * | 8/2018 | Boss | B60L 53/14 |
| 2018/0312276 | A1 * | 11/2018 | Miller | B64F 1/125 |
| 2019/0002127 | A1 * | 1/2019 | Straus | B64U 50/37 |
| 2019/0023113 | A1 * | 1/2019 | Stoltz | F01K 23/02 |
| 2019/0039751 | A1 * | 2/2019 | Janssen | G08G 5/0069 |
| 2019/0100108 | A1 * | 4/2019 | Davis | B64U 80/84 |
| 2019/0161190 | A1 * | 5/2019 | Gil | B64U 10/16 |
| 2019/0245365 | A1 * | 8/2019 | Farrahi Moghaddam | B64C 39/024 |
| 2019/0276140 | A1 * | 9/2019 | Poltorak | B64C 17/02 |
| 2019/0291961 | A1 * | 9/2019 | Urban | G06Q 10/0832 |
| 2019/0315235 | A1 * | 10/2019 | Kung | B64U 50/39 |
| 2019/0348862 | A1 * | 11/2019 | Obayashi | B64U 50/38 |
| 2020/0055613 | A1 * | 2/2020 | Miller | B64F 1/222 |
| 2020/0130864 | A1 * | 4/2020 | Brockers | B64F 1/007 |
| 2020/0165008 | A1 * | 5/2020 | Krauss | B64F 1/12 |
| 2020/0207484 | A1 * | 7/2020 | Foggia | B64F 1/36 |
| 2020/0288895 | A1 * | 9/2020 | Bennet | H04W 12/03 |
| 2021/0125503 | A1 * | 4/2021 | Henry | G05D 1/606 |
| 2021/0148131 | A1 * | 5/2021 | Wankewycz | H02J 7/00 |
| 2021/0171218 | A1 * | 6/2021 | Scherz | B64U 80/25 |

FOREIGN PATENT DOCUMENTS

| | | |
|---|---|---|
| CN | 212710028 A | 3/2021 |
| CN | 212710028 U | 3/2021 |
| CN | 212827924 U | 3/2021 |
| CN | 112937896 A | 6/2021 |
| CN | 113247289 A | 8/2021 |
| KR | 102143497 B1 | 8/2020 |

* cited by examiner

AUTOMATIC RECYCLING AND CHARGING NEST FOR VERTICAL TAKE-OFF AND LANDING UNMANNED AERIAL VEHICLE

TECHNICAL FIELD

The embodiments of the disclosure relates to the technical field of take-off and landing of unmanned aerial vehicles, in particular to an automatic recycling and charging nest for a vertical take-off and landing unmanned aerial vehicle.

BACKGROUND

An unmanned aircraft is abbreviated as an "unmanned aerial vehicle", which is abbreviated as "UAV" in English. It is an unmanned aircraft manipulated by a piece of radio remote control equipment and a self-contained program control device, or is autonomously operated by a vehicle-mounted computer completely or intermittently. With the rapid development of unmanned aerial vehicle technology, the use of the unmanned aerial vehicle has gradually been promoted and applied in the fields of aerial photography, agriculture, plant protection, surveying and mapping, news reporting, power patrol inspection, disaster relief, film and television shooting, and so on. However, with the continuous improvement of use requirements of the unmanned aerial vehicle, there are still some deficiencies that need to be improved urgently during a landing process of the unmanned aerial vehicle.

An electric vertical take-off and landing unmanned aerial vehicle adopts a patented technology of a retractable rotor to realize vertical take-off and landing. It has high carrying capacity, long endurance and the ability of vertical take-off and landing on a plateau at an altitude of 5000 meters. It is flexible to mount and can carry loads such as a visible light camera, a tilt camera, a multi-spectral camera, a dual-light pod and a laser radar. The maximum vertical loading capacity can reach 10 kg, the longest endurance can reach 4 hours, and it can carry a variety of loads at the same time for working.

Eight rotors on four axes are used for providing vertical take-off and landing power, the maximum take-off thrust of a power system exceeds 70 kg, which is practically 36 kg, therefore, there is sufficient power margin, even if a pair of propellers stalls, safe landing of the unmanned aerial vehicle can also be guaranteed.

A large aspect ratio wing design is used, matched with wingtip winglets, and the eight rotors on the four axes are folded back into a fuselage in a flight phase at the same time, thereby greatly reducing the resistance and improving the time of endurance, and a rotor folding and unfolding process is entirely completed automatically without manual intervention.

In the related art, the unmanned aerial vehicle will inevitably produce a ground effect during take-off and landing. The ground effect refers to aerodynamic interference of the ground on an object when the moving object is running close to the ground, which will cause unpredictable changes in the posture of the unmanned aerial vehicle during take-off and landing, and in severe cases, it will cause the unmanned aerial vehicle to tilt and tip over, thus increasing the potential safety hazards for the use of the unmanned aerial vehicle.

SUMMARY

The embodiments of the disclosure are implemented by the following technical solution: an automatic recycling and charging nest for a vertical take-off and landing unmanned aerial vehicle, including a cabin body and an openable and closable top cover installed on the top of the cabin body, wherein an inner cabin is further installed in the cabin body, the height of the inner cabin is the same as that of the cabin body, a rotating mechanism is further arranged inside the inner cabin, a clamping and centering device is installed on the top of the inner cabin, and a locking and charging device is further installed on the clamping and centering device; and the locking and charging device includes a base connected with the clamping and centering device, and a pneumatic hydraulic clamp for charging connected to the base.

The embodiments of the disclosure further have the following technical features:

The rotating mechanism includes a support frame installed on a bottom plate of the inner cabin, and a rotating platform connected with the support frame through a mounting shaft;

a driven gear is sleeved on the mounting shaft, the driven gear is engaged with a driving gear, and the driving gear is connected with a motor; and the diameter of the driving gear is less than the diameter of the driven gear.

A top plate of the inner cabin is open, and a surface of the rotating platform is flush with the top plate of the inner cabin.

The clamping and centering device includes an X1 axis and an X2 axis, which are connected with the top plate of the inner cabin, and a Y1 axis and a Y2 axis, which are connected with the X1 axis and the X2 axis;

the X1 axis and the X2 axis are arranged in parallel on both sides of the rotating mechanism, and the Y1 axis and the Y2 axis are arranged in parallel on the X1 axis and the X2 axis;

the X1 axis includes an X axis guide rail mounting plate connected with the top plate of the inner cabin, and a first lead screw mounting plate vertically connected with one side of the X axis guide rail mounting plate along a length direction;

a first X axis lead screw and a second X axis lead screw are installed on the first lead screw mounting plate through first X axis supporting seats, the first X axis lead screw and the second X axis lead screw are respectively connected with a right-angle commutator installed on the first lead screw mounting plate through X axis couplings, and an X axis motor is connected to the right-angle commutator;

an X axis guide rail is installed on the X axis guide rail mounting plate, and an X axis slide block is installed on the X axis guide rail;

the rotation direction of the first X axis lead screw is opposite to that of the second X axis lead screw, Y axis connecting devices are respectively connected to both the first X axis lead screw and the second X axis lead screw through nuts, and the Y axis connecting devices are connected with the slide block; and the X2 axis has the same structure as the X1 axis.

Both ends of the X axis guide rail mounting plate in the length direction are further vertically connected with end plates, and second X axis supporting seats are installed on the end plates;

limit switches are respectively installed on the both ends of the first X axis lead screw and the second X axis lead screw away from the X axis couplings; and the other side of the first lead screw mounting plate along the length direction is further vertically connected with a dust guard plate.

The Y1 axis includes a second lead screw connecting plate connected with the Y axis connecting device, the middle of the second lead screw connecting plate is connected with a Y axis coupling, the both ends of the Y axis coupling are respectively connected with a first Y axis lead screw and a second Y axis lead screw, and the first Y axis lead screw and the second Y axis lead screw are respectively connected with the second lead screw connecting plate through Y axis supporting seats;

one side of the second lead screw connecting plate along the length direction of the second guide rail mounting plate is vertically connected with a first Y axis guide rail mounting plate and a second Y axis guide rail mounting plate, Y axis guide rails are respectively installed on the first Y axis guide rail mounting plate and the second Y axis guide rail mounting plate, and Y axis slide blocks are installed on the Y axis guide rails;

the rotation direction of the first Y axis lead screw is opposite to that of the second Y axis lead screw, push plates are connected to both the first Y axis lead screw and the second Y axis lead screw through nuts, the push plates are connected with the slide blocks, and the other end of the second Y axis lead screw is connected with a Y axis motor; and the Y2 axis has the same structure as the Y1 axis.

The locking and charging device includes a base connected with the second lead screw connecting plate, and a pneumatic hydraulic clamp for charging connected to the base;

the pneumatic hydraulic clamp for charging includes a guide block connected to an upper surface of the base and a first connecting plate connected to the upper surface of the guide block, and the first connecting plate can move on the upper surface of the guide block;

one end of the first connecting plate stretches out from the upper surface of the guide block, the end of the first connecting plate stretching out from the guide block is further connected with a charging panel, one end of the charging panel back to the guide block is provided with a charging groove, and a charging elastic sheet is arranged inside the charging groove; and a power block is further connected to the base, an electrical interface and a pneumatic interface are arranged on the power block, the electrical interface is used for supplying power to the charging elastic sheet, and the pneumatic interface is used for supplying energy to the first connecting plate.

A pair of pneumatic hydraulic clamps for charging is respectively arranged on the Y2 axis and the Y1 axis, and the distance between the pair of pneumatic hydraulic clamps for charging is determined according to the distance between a landing gear of the unmanned aerial vehicle.

The top cover includes a first top cover and a second top cover that are covered on the top of the cabin body, the first top cover and the second top cover are respectively connected with the cabin body through a connecting mechanism, the connecting mechanism includes a first connecting mechanism for connecting the first top cover with the cabin body, and a second connecting mechanism;

the first connecting mechanism includes a connecting rod 2 hinged on a side wall of the cabin body in the length direction and an electric push rod 2 hinged with the connecting rod 2, the other end of the electric push rod 2 is hinged with the side wall of the cabin body in the length direction, the connecting rod 2 is L-shaped, and an intermediate included angle α is 153°;

the first connecting mechanism further includes a connecting rod 1 hinged on the side wall of the cabin body in the length direction and an electric push rod 1 hinged with the connecting rod 1, the other end of the electric push rod 1 is hinged with the side wall of the inner cabin facing the length direction of the cabin body, the height of a hinge point is the same as that of the cabin body, the connecting rod 1 is L-shaped, and the intermediate included angle α is 153°; and the structure of the second connecting mechanism is the same as that of the first connecting mechanism.

A wireless charging transmitting terminal is further connected to the support frame, and the wireless charging transmitting terminal is located directly below the rotating platform; and a temperature control device and a dehumidification device are further arranged inside the inner cabin.

BRIEF DESCRIPTION OF THE DRAWINGS

The drawings described herein are used for providing a further understanding of the embodiments of the disclosure and constitute a part of the embodiments of the disclosure. The exemplary embodiments of the disclosure and descriptions therefore are used for explaining the embodiments of the disclosure, but do not constitute improper limitations of the embodiments of the disclosure. In the drawings.

Figure 1:
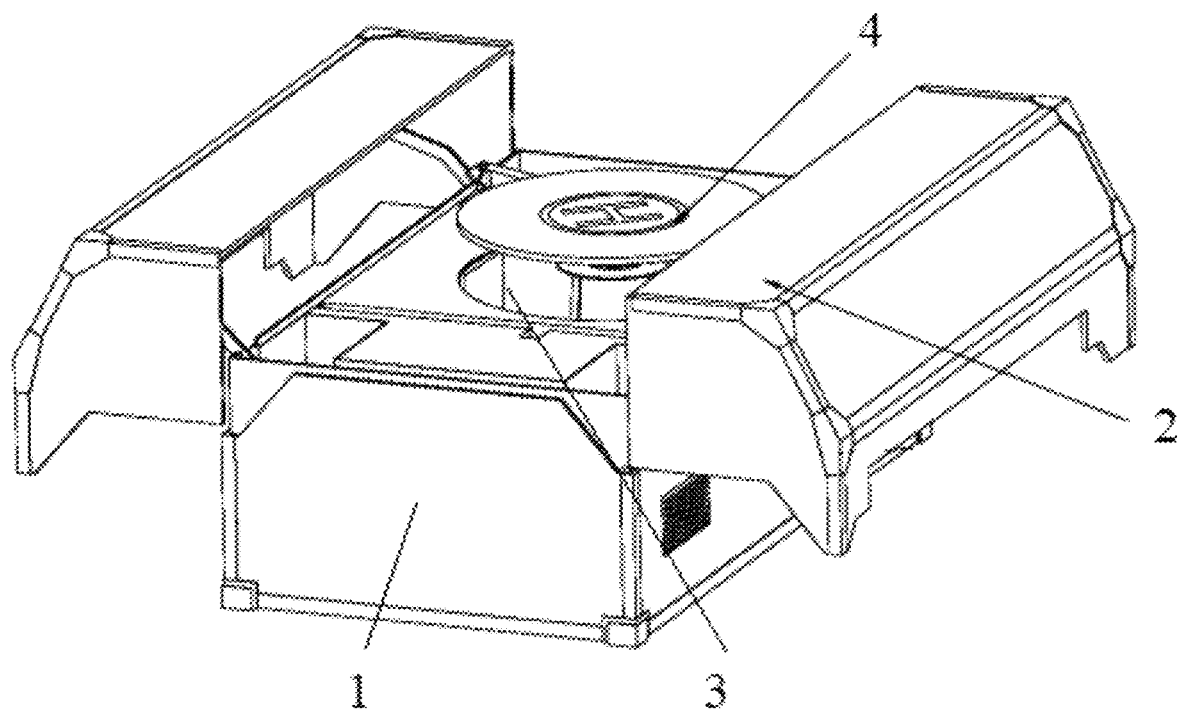
FIG. 1 is a schematic structural diagram of the embodiments of the disclosure.
Figure 2:
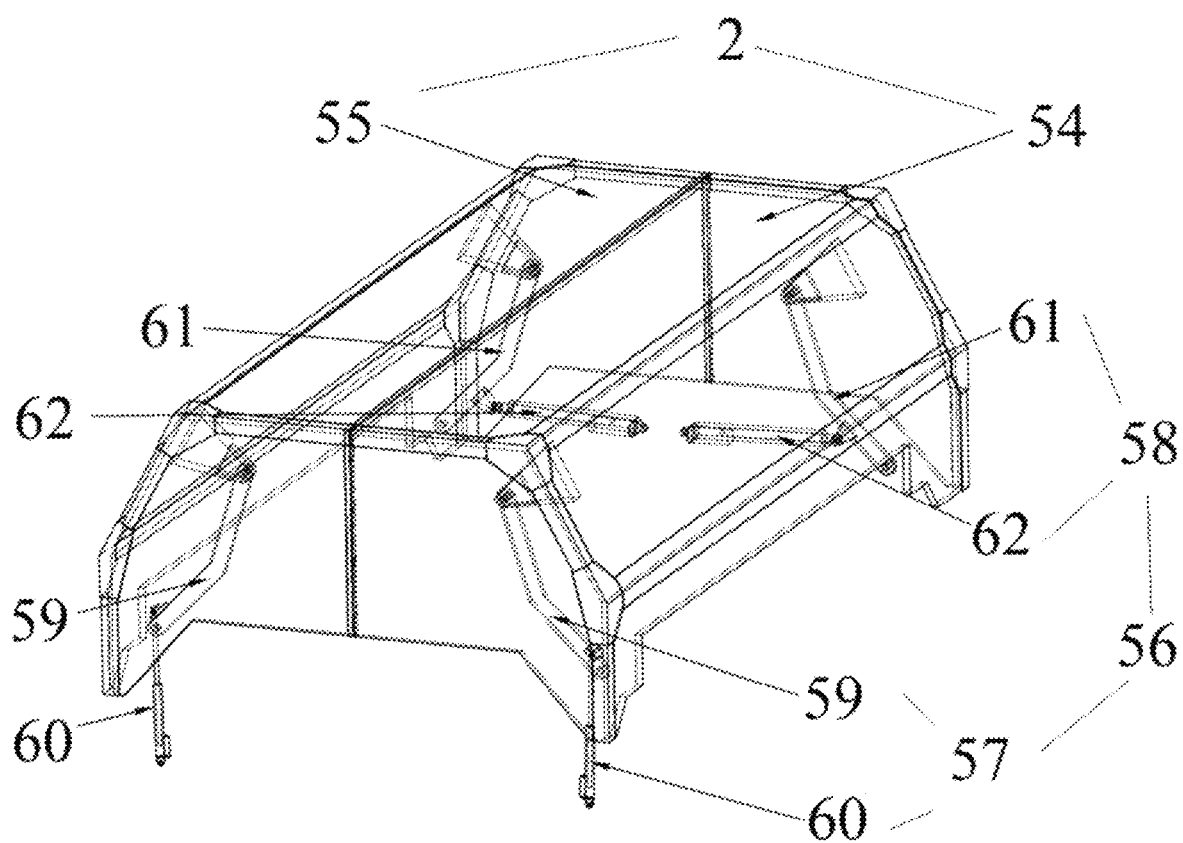
FIG. 2 is a schematic structural diagram of a top cover and a connecting mechanism of the embodiments of the disclosure.
Figure 3:
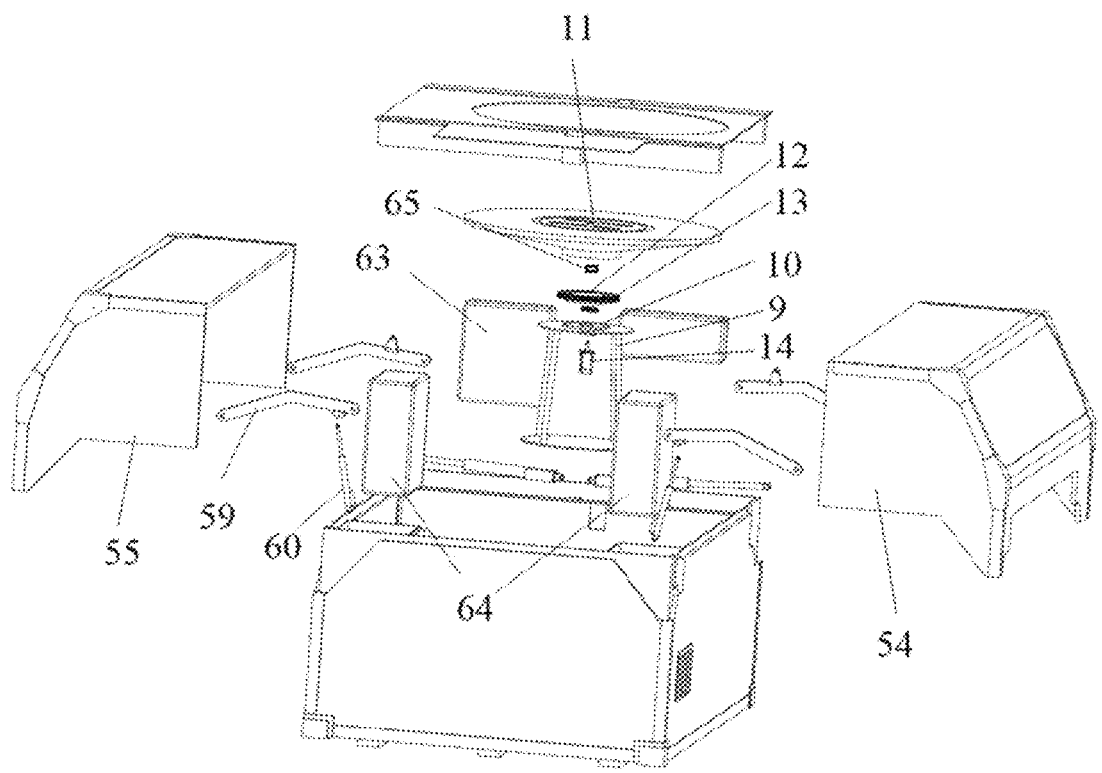
FIG. 3 is an exploded view of the embodiments of the disclosure.
Figure 4:
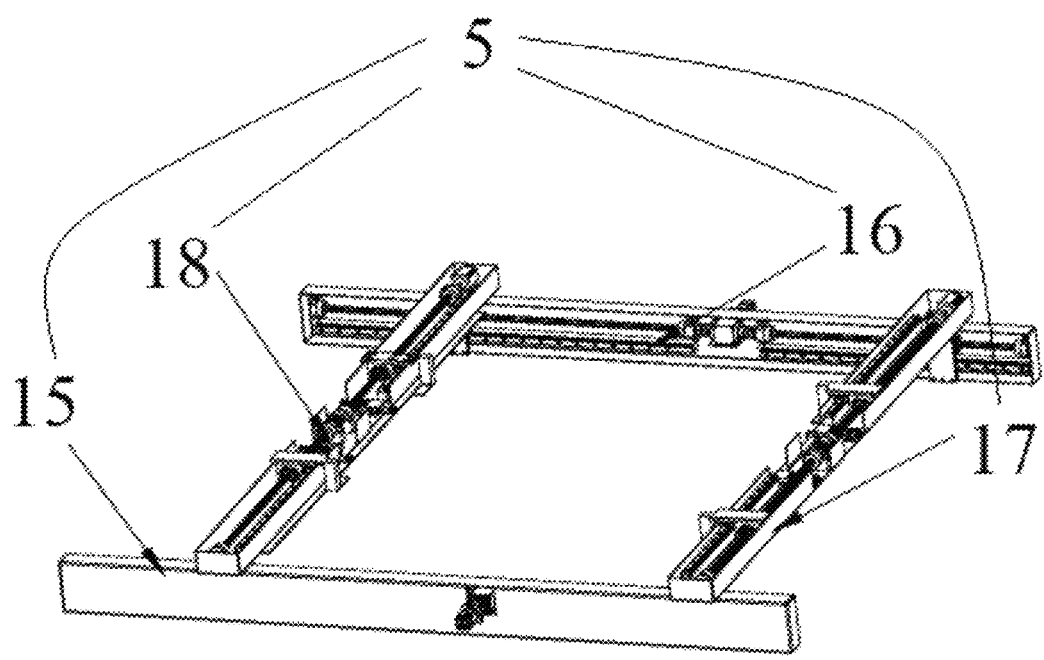
FIG. 4 is a schematic structural diagram of a clamping and centering device of the embodiments of the disclosure.

The specific content of the embodiments of the disclosure will be further explained in detail below in conjunction with embodiments.

DETAILED DESCRIPTION OF THE EMBODIMENTS

Specific embodiments of the disclosure are given below. It should be noted that the embodiments of the disclosure is not limited to the following specific embodiments, and all equivalent transformations made on the basis of the technical solutions of the embodiments of the disclosure fall within the protection scope of the embodiments of the disclosure.

Orientation or position relationships indicated by terms "upper", "lower", "front", "rear", "top", "bottom" and the like used in the embodiments of the disclosure are only for the convenience of describing the embodiments of the disclosure and simplifying the description, rather than indicating or implying that a device or an element referred to must have a specific orientation, or be constructed and operated in a specific orientation, "inside" and "outside" refer to the inside and outside of the contour of a corresponding component, and the above terms should not be construed as limiting the embodiments of the disclosure.

In the embodiments of the disclosure, in the absence of instructions to the contrary, the terms "installed", "connection", "connected", "fixed" and the like should be understood in a broad sense. For example, it can be fixedly connected, and it can also be detachably connected or integrated; it can be a mechanical connection, and it can also be an electrical connection; it can be directly connected, it can also be indirectly connected through an intermediate medium, and it can be the internal communication of two elements or the interaction relationship between the two elements. For those skilled in the art, the specific meanings of the above-mentioned terms in the embodiments of the disclosure can be understood according to specific circumstances.

In view of the deficiencies in the prior art, the purpose of the embodiments of the disclosure is to provide an automatic recycling and charging nest for a vertical take-off and landing unmanned aerial vehicle, so as to solve the technical problems in the prior that there is no nest for storing the vertical take-off and landing unmanned aerial vehicle, and that an existing nest is insufficient in centering and positioning accuracy and poor in overall environmental adaptability.

Following the above technical solution, as shown in FIGS. 1-22, an automatic recycling and charging nest for a vertical take-off and landing unmanned aerial vehicle includes a cabin body 1 and an openable and closable top cover 2 installed on the top of the cabin body 1, an inner cabin 3 is further installed in the cabin body 1, the height of the inner cabin 3 is the same as that of the cabin body 1, a rotating mechanism 4 is further arranged inside the inner cabin 3, a clamping and centering device 5 is installed on the top of the inner cabin 3, and a locking and charging device 6 is further installed on the clamping and centering device 5; and the locking and charging device 6 includes a base 7 connected with the clamping and centering device 5, and a pneumatic hydraulic clamp 8 for charging connected to the base 7.

The unmanned aerial vehicle is a fixed-wing unmanned aerial vehicle.

The shape of the nest adopts a large oblique angle design, wherein an included angle between an inclined plane and a vertical plane is 152°, and the included angle with a horizontal plane is 118°, which minimizes the wind resistance; in addition, the self-weight of the nest is about 2400 kg, thus the nest is used at a fixed place, metal and non-metal structural parts are installed on a concrete base, and are stably fixed at required positions, and the power source is an externally grounded buried cable, and a substation provides the power supply. If movement is required, the nest is designed as an entire structure, a plurality of ground fixing pull hooks are arranged on the outer circle, when the pull hooks are installed, they are fixed on the ground by using expansion screws or in other manners, and it is ensured that the nest remains stable under the influence of wind. By means of the above measures, the nest can withstand six to seven strong winds. Under strong winds of force six to seven, the nest can be opened and closed normally.

A seam is sealed with a sealing strip and styrofoam, mechanical part plates are connected by a sunken sealing groove, a sealing ring is placed in the sealing groove, and the sealing ring is deformed in a pressing lap joint manner to approach to the structural part, so as to realize a sealing effect; and in an area where there is no space to use the sealing ring structure but there is a possibility of leakage, waterproof styrofoam is used for sealing to prevent rainwater leakage.

The openable and closable top cover 2 adopts a hooked hand lap joint contact manner, an elastic sealing gasket is buried in a contact surface in advance, when the cover is closed, the sealing gasket is in a squeezed state and is fully fit with the structural part, so as to realize the sealing effect, and the cabin body 1 and the top cover 2 adopt a double waterproof structure of convex edges and sealing gaskets, and special anti-salt spray paint coating for the navy is selected for the outside; processed parts are made of corrosion-resistant stainless steel materials (push rods and supporting parts), and non-metallic high-strength polymer materials (such as belts) as much as possible; the motor is a high-IP motor; and a lifting mechanism is made of a stainless steel lead screw and a copper nut.

The shell of the entire cabin body 1 adopts a sandwich structure, and the middle is filled with a thermal insulation material, so as to reduce the influence of an outside air temperature on the temperature in the cabin body 1.

The overall nest of the embodiments of the disclosure is mainly divided into the following three parts:
1. The upper part is a top cover protection area, whose function is to isolate the unmanned aerial vehicle from the outside, so as to prevent the unmanned aerial vehicle from being damaged by the external environment.
2. The middle part is a receiving and positioning adjustment carrying area, which is used for receiving a positioning platform and carrying the unmanned aerial vehicle.
3. The bottom part is an electromechanical control and charging area, which is used for executing positioning and rotation actions, and including a charging and discharging system; a rotating and positioning mechanism; and a nest power source and master control system.

The rotating mechanism 4 is used for rotating the unmanned aerial vehicle to a fixed position after landing and turning the handpiece of the unmanned aerial vehicle to a windward direction before taking off.

After the unmanned aerial vehicle is rotated in place, four landing supporting legs are already parallel to a specified direction, the clamping and centering device 5 is used for performing gear pushing and positioning to translate the unmanned aerial vehicle to a specified position, which is convenient for subsequent operations such as charging.

After the unmanned aerial vehicle lands, the locking and charging device 6 is used for performing wired charging on the unmanned aerial vehicle through a landing gear after landing, and playing a certain fixation role.

As a preference of the present embodiment, the rotating mechanism 4 includes a support frame 9 installed on a bottom plate of the inner cabin 3, and a rotating platform 11 connected with the support frame 9 through a mounting shaft 10;
  a driven gear 12 is sleeved on the mounting shaft 10, the driven gear 12 is engaged with a driving gear 13, and the driving gear 13 is connected with a motor 14;
  the motor 14 drives the driving gear 13 to rotate, the driving gear 13 drives the driven gear 12 to rotate, and finally drives the rotating platform 11 to rotate; and
  the rotating mechanism 4 performs internal rotation, and is a set of horizontally placed rotating bearing for lifting and carrying a rotating table. A gear coaxial with the rotating table is rotated and carried by a motor reducing gear, or it is driven to rotate in a lighter belt transmission/friction wheel transmission manner, the four landing supporting legs of the unmanned aerial vehicle have a size of width 410*length 350, and occupy a space of 1040 mm, including an offset of ±500 mm, the overall space diameter of the rotating platform is 2100 mm, which can basically cover 99.6% of the landing position, if encountering an extreme landing position, the unmanned aerial vehicle can be ordered, according to the deviation direction and angle, to take off and land again at a low altitude, or, the unmanned aerial vehicle is ordered to enter a more accurate area in other positioning manners.

When the unmanned aerial vehicle returns in a windy weather, the rotating mechanism performs wind direction alignment through a nest linkage manner, firstly, before the unmanned aerial vehicle lands, wind direction information is transmitted to a nest control system by the unmanned aerial vehicle or a ground weather station through a data transmission chain, the wind direction information is transmitted in two manners, so when the weather monitoring performance of one party fails, the other party can complete the transmission of the wind direction information, thereby ensuring the stability of the unmanned aerial vehicle in a windward take-off and landing stage; and secondly, the control system controls the rotating platform through a PLC and a driver to rotate in azimuth, a baseline angle of the rotating mechanism is consistent with a landing angle direction of the unmanned aerial vehicle, the unmanned aerial vehicle starts to land after receiving a landing permission instruction of the nest, and performs a next centering action after the landing is completed.

As a preference of the present embodiment, a top plate of the inner cabin 3 is open, and a surface of the rotating platform 11 is flush with the top plate of the inner cabin 3.

As a preference of the present embodiment, the clamping and centering device 5 includes an X1 axis 15 and an X2 axis 16, which are connected with the top plate of the inner cabin 3, and a Y1 axis 17 and a Y2 axis 18, which are connected with the X1 axis 15 and the X2 axis 16;
  the X1 axis 15 and the X2 axis 16 are arranged in parallel on both sides of the rotating mechanism 4, and the Y1 axis 17 and the Y2 axis 18 are arranged in parallel on the X1 axis 15 and the X2 axis 16;
  the X1 axis 15 includes an X axis guide rail mounting plate 19 connected with the top plate of the inner cabin 3, and a first lead screw mounting plate 20 vertically connected with one side of the X axis guide rail mounting plate 19 along a length direction;
  a first X axis lead screw 22 and a second X axis lead screw 23 are installed on the first lead screw mounting plate 20 through first X axis supporting seats 21, the first X axis lead screw 22 and the second X axis lead screw 23 are respectively connected with a right-angle commutator 25 installed on the first lead screw mounting plate 20 through X axis couplings 24, and an X axis motor 26 is connected to the right-angle commutator 25;
  an X axis guide rail 27 is installed on the X axis guide rail mounting plate 19, and an X axis slide block 28 is installed on the X axis guide rail 27;
  the rotation direction of the first X axis lead screw 22 is opposite to that of the second X axis lead screw 23, Y axis connecting devices 30 are respectively connected to both the first X axis lead screw 22 and the second X axis lead screw 23 through nuts 29, and the Y axis connecting devices 30 are connected with the X axis slide block 28; and
  the X2 axis 16 has the same structure as the X1 axis 15. The X1 axis 15 and the X2 axis 16 do not move themselves, and their main function is to drive the Y1 axis 17 and the Y2 axis 18 to move. A limit switch 33 is used for detecting movement positions of the first X axis lead screw 22 and the second X axis lead screw 23 and feeding back the same to a PLC control system, so as to ensure the reliability of the system; the main function of the right-angle commutator 25 is to change the direction of the axis, so that the X axis motor 26 can simultaneously drive the first X axis lead screw 22 and the second X axis lead screw 23 to rotate, and the two axes have the same rotating speed; and in addition, the X axis motor 26, the first X axis lead screw 22 and the second X axis lead screw 23 are distributed at positions forming 90°, the two lead screws have the same rotating speed, when the X axis motor 26 rotates, the X axis motor 26 can drive the first X axis lead screw 22 and the second X axis lead screw 23 to rotate, such that the Y1 axis 17 and the Y2 axis 18 thereon move toward or away from each other.

As a preference of the present embodiment, both ends of the X axis guide rail mounting plate 19 in the length direction are further vertically connected with end plates 31, and second X axis supporting seats 32 are installed on the end plates 31;
- limit switches 33 are respectively installed on the both ends of the first X axis lead screw 22 and the second X axis lead screw 23 away from the X axis couplings 24; and
- the other side of the first lead screw mounting plate 20 along the length direction is further vertically connected with a dust guard plate 34.

The design of the X axis guide rail 27 enables the guide rail to bear a lateral load without deforming the lead screw, so that the service life of the lead screw can be prolonged; and the first X axis supporting seat 21 and the second X axis supporting seat 32 are arranged to make the lead screw run better, so as to prolong the service life. The dust guard plate 34 is arranged to reduce the entering possibility of foreign matters.

As a preference of the present embodiment, the Y1 axis 17 includes a second lead screw connecting plate 35 connected with the Y axis connecting device 30, the middle of the second lead screw connecting plate 35 is connected with a Y axis coupling 36, the both ends of the Y axis coupling 36 are respectively connected with a first Y axis lead screw 37 and a second Y axis lead screw 38, and the first Y axis lead screw 37 and the second Y axis lead screw 38 are respectively connected with the second lead screw connecting plate 35 through Y axis supporting seats 39;
- one side of the second lead screw connecting plate 35 along the length direction of the second lead screw connecting plate 35 is vertically connected with a first Y axis guide rail mounting plate 40 and a second Y axis guide rail mounting plate 41, Y axis guide rails 42 are respectively installed on the first Y axis guide rail mounting plate 40 and the second Y axis guide rail mounting plate 41, and Y axis slide blocks 43 are installed on the Y axis guide rails 42;
- the rotation direction of the first Y axis lead screw 37 is opposite to that of the second Y axis lead screw 38, push plates 44 are connected to both the first Y axis lead screw 37 and the second Y axis lead screw 38, the push plates 44 are connected with the Y axis slide blocks 43, and the other end of the second Y axis lead screw 37 is connected with a Y axis motor 45; and
- the Y2 axis 18 has the same structure as the Y1 axis 17.

The X1 axis and the X2 axis are designed in parallel below, and the both ends of the Y1 axis and the Y2 axis are respectively installed on the Y axis connecting devices 30 on the X1 axis and the X2 axis, so as to form an X-Y plane motion system together. During centering, the PLC controls the X1 axis motor and the X2 axis motor to rotate at first, since the first X axis lead screw 22 and the second X axis lead screw 23 have opposite rotation directions, the Y axis connecting devices 30 on the X1 axis and the X2 axis are driven to symmetrically compress, so that the Y1 axis and the Y2 axis respectively installed in the Y axis connecting devices 30 are compressed together symmetrically, thus pushing the unmanned aerial vehicle to move toward the central position of the X axis, after the X axis moves to an extreme position, the limit switch sends a signal to the PLC, so that the X axis motor stops moving, and at this time, the centering in the X axis direction is completed; and then, the Y axis motor starts rotating, since the first Y axis lead screw 37 and the second Y axis lead screw 38 have opposite rotation directions, the push plates 44 on the Y1 axis and the Y2 axis are driven to symmetrically compress, thus pushing the unmanned aerial vehicle to move toward the central position of the Y axis, after the Y axis moves to the extreme position, the limit switch feeds back the signal to the PLC, so that the motor stops moving, and at this time, the centering in the Y axis direction is completed. The centering mechanism has the advantages of simple structure, low cost and easy maintenance, and the control system composed of the PLC and a sensor can realize the linkage of the nest, thereby effectively improving the positioning accuracy of the motor and the reliability of the centering action, and preventing the Y1 axis and the Y2 axis from damaging the unmanned aerial vehicle.

After the unmanned aerial vehicle rotates in place, the four landing supporting legs are already parallel to the specified direction, gear pushing and positioning need to be performed to translate the unmanned aerial vehicle to the specified position with an error within 10 mm, so that the unmanned aerial vehicle can be conveniently fixed by a landing supporting leg locking mechanism.

The clamping and centering mechanism is around the rotating mechanism, four motor guide rails drive the lead screw for supplying power, and the clamping and centering mechanism is installed on a high-strength lining plate and is supported by a bottom lining plate.

The clamping and centering mechanism actuates by using the motor to drive the lead screw, so as to push the landing supporting legs to specified positions.

After the unmanned aerial vehicle lands, the X axis motor 26 actuates the X axis to drive the Y axis to move, so that the landing unmanned aerial vehicle is first in place in the Y axis direction, and then the Y axis motor 45 actuates to drag the Y1 axis 17 and the Y2 axis 18 to move relatively, so as to fold the supporting legs of the unmanned aerial vehicle in the Y direction.

The clamping and centering mechanism uses a motor system composed of a stepper motor and a guide rail lead screw as an actuator, the action is controlled by the PLC and a driver, and a limit sensor is designed, a stepper motor and driver exchanges a signal with the PLC through a Profinet bus, the PLC sends a pulse signal to the driver, the current is amplified by X axis and Y axis drivers to control the corresponding stepper motor to walk, since the X axis and the Y axis are respectively composed of two left-handed and right-handed ball screws in series, when the stepper motor rotates, a screw nut drives the Y1 axis 17 and the Y2 axis 18 to compress symmetrically, so as to push the landing supporting legs to the specified positions. By means of the control of the PLC system, the X axis and the Y axis can be accurately positioned within the stroke range, and the stepper motor is equipped with a rotary encoder for feeding back and displaying the position of the rotating mechanism.

The centering mechanism has the advantages of simple structure, low cost and easy maintenance, and the control system composed of the PLC and the sensor can realize the linkage of the nest, thereby effectively improving the positioning accuracy of the motor and the reliability of the centering action, and avoiding damage to the unmanned aerial vehicle.

An upper protection cover is supported around the middle receiving and positioning carrying area. The rotating mechanism of the protection cover is inside the protection cover and at the bottom of a carrying platform. As long as its height is lower than the lowest point of the main body of the unmanned aerial vehicle, because when the unmanned aerial vehicle is landing and rotating, the four landing supporting legs will leave the space below the unmanned aerial vehicle, so a motor, a hydraulic pipeline, a rotation limiting mechanism and other components of the upper protection cover can be installed within this height.

Embedded locking assembly is applied to the overall carrying area, a lap joint structure is applied to the surrounding, and a high-strength lining plate is applied to the bottom to ensure the carrying capacity.

As a preference of the present embodiment, the locking and charging device 6 includes a base 7 connected with the second lead screw connecting plate 35, and a pneumatic hydraulic clamp 8 for charging connected to the base 7;

the pneumatic hydraulic clamp 8 for charging includes a guide block 46 connected to an upper surface of the base 7 and a first connecting plate 47 connected to the upper surface of the guide block 46, and the first connecting plate 47 can move on the upper surface of the guide block 46;

one end of the first connecting plate 47 stretches out from the upper surface of the guide block 46, the end of the first connecting plate 47 stretching out from the guide block 46 is further connected with a charging panel 48, one end of the charging panel 48 back to the guide block 46 is provided with a charging groove 49, and a charging elastic sheet 50 is arranged inside the charging groove 49; and a power block 51 is further connected to the base 7, an electrical interface 52 and a pneumatic interface 53 are arranged on the power block 51, the electrical interface 52 is used for supplying power to the charging elastic sheet 50, and the pneumatic interface 53 is used for supplying energy to the first connecting plate 47.

According to the shape of the landing gear supporting leg, a forceps holder part of the pneumatic hydraulic clamp of the locking and charging device 6 is designed into a landing gear profiling structure, and releasing and clamping actions are completed by using a pneumatic/hydraulic forceps holder, so as to control the clamping and placing of the unmanned aerial vehicle.

After the X axis and the Y axis push the unmanned aerial vehicle to the specified position, the pneumatic interface 53 supplies energy to the first connecting plate 47, the first connecting plate 47 moves forward, a landing gear electrode enters the charging groove 49, and the charging elastic sheet 50 is deformed under pressure to turn on the power source to start charging.

The locking and charging device 6 is fixed on the clamping and centering mechanism to correspond to a final position after the unmanned aerial vehicle is calibrated, and the clamping and centering mechanism is used as a carrier to effectively avoid errors caused by relative movement.

As a preference of the present embodiment, a pair of pneumatic hydraulic clamps 6 for charging is respectively arranged on the Y2 axis 18 and the Y1 axis 17, and the distance between the pair of pneumatic hydraulic clamps 6 for charging is determined according to the distance between a landing gear of the unmanned aerial vehicle.

As a preference of the present embodiment, the top cover 2 includes a first top cover 54 and a second top cover 55 that are covered on the top of the cabin body 1, the first top cover 54 and the second top cover 55 are respectively connected with the cabin body 1 through a connecting mechanism 56, the connecting mechanism 56 includes a first connecting mechanism 57 for connecting the first top cover 54 with the cabin body 1, and a second connecting mechanism 58 for connecting the second top cover 55 with the cabin body 1;

the first connecting mechanism 57 includes a connecting rod 259 hinged on a side wall of the cabin body 1 in the length direction and an electric push rod 260 hinged with the connecting rod 259, the other end of the electric push rod 260 is hinged with the side wall of the cabin body 1 in the length direction, and the connecting rod 259 is L-shaped;

the first connecting mechanism 57 further includes a connecting rod 161 hinged on the side wall of the cabin body 1 in the length direction and an electric push rod 162 hinged with the connecting rod 161, the other end of the electric push rod 162 is hinged with the side wall of the inner cabin 3 facing the length direction of the cabin body 1, the height of a hinge point is the same as that of the cabin body 1, and the connecting rod 161 is L-shaped; and the structure of the second connecting mechanism 58 is the same as that of the first connecting mechanism 57.

When the first top cover 54 is opened, the PLC sends a signal to the driver to cause the electric push rod 1 and the electric push rod 2 that are respectively installed on the both sides of the first top cover 54 to start moving at the same time, wherein the electric push rod 1 extends and the electric push rod 2 contracts, so a to respectively drive the connecting rod 1 and the connecting rod 2 to rotate toward an outer side direction of the nest, the connecting rod 1 and the connecting rod 2 drive the right cover to move so as to gradually open it, the right cover stops moving until the electric push rod 1 and the electric push rod 2 respectively move to the extreme positions, and the right cover is fully opened. The principle and manner of opening the second top cover 55 are the same as those of the first top cover 54, so no repeated description will be given herein.

When the first top cover 54 is closed, the PLC sends a signal to the driver to cause the electric push rod 1 and the electric push rod 2 that are respectively installed on the both sides of the right cover to start moving at the same time, wherein the electric push rod 1 contracts and the electric push rod 2 extends, so as to respectively drive the connecting rod 1 and the connecting rod 2 to rotate toward an inner side direction of the nest, the connecting rod 1 and the connecting rod 2 drive the right cover to move so as to gradually close it, the right cover stops moving until the electric push rod 1 and the electric push rod 2 respectively move to the extreme positions, and the first top cover 54 is fully closed. The principle and manner of closing the second top cover 55 are the same as those of the first top cover 54, so no repeated description will be given herein.

The electric push rods are respectively installed at distances of about 0.11 L and 0.04 L from the both sides (the length of the nest is L), the analysis shows that the electric push rods and other flip mechanisms are installed at the positions, which can not only meet the structural and mechanical properties of the flip mechanisms, but also can enable the left and right covers of the honeycomb to be normally opened and closed, and can also optimize the spatial layout inside the honeycomb, and reduce the complexity of the overall structure of the honeycomb.

As a preference of the present embodiment, a wireless charging transmitting terminal 63 is further connected to the support frame 9, and the wireless charging transmitting terminal 63 is located directly below the rotating platform 11; and the wireless charging transmitting terminal is installed below a take-off and landing platform, since a parking platform needs to be rotated, a coil of the wireless charging transmitting terminal is fixedly installed below the parking platform and does not move with the parking platform, this design manner will not affect the mechanical equilibrium of the honeycomb parking platform, but is conducive to improving the reliability and scalability of the system; a receiving coil is installed in the middle of a belly, since the fuselage is made of carbon fibers, a yellow part on the handpiece is a section where a compass, a sensor and other equipment are arranged, a green part is a section where a battery is installed, and a red part is a section where the coil of a wireless charging receiving terminal can be installed. Since the middle of the belly has the highest mechanical strength, and the installation of the coil has the least influence on the overall balance of the unmanned aerial vehicle, the receiving coil is installed in the middle of the belly, which is conducive to reducing the influence of the installation of the coil on the flight stability and the strength of the unmanned aerial vehicle.

In order to improve the transmission efficiency and reduce the magnetic radiation, a ferrite is added above the receiving terminal. In addition, a receiving terminal rectifier circuit is encapsulated inside the fuselage and weighs less than 1 kg. Simulation analysis of a magnetic field shows that the coil of the receiving terminal can receive the magnetic field energy well, and the amount of magnetic leakage is small. After analogue simulation is performed on the influence of the relative position of the receiving terminal and the transmitting terminal on the mutual inductance, it can be seen that, when the landing horizontal position of the unmanned aerial vehicle deviates ±10 cm, the system can still keep relatively good coupling and maintain relatively high charging efficiency.

In order to avoid the influence of the magnetic field on the performance of the unmanned aerial vehicle itself, we perform analogue simulation on magnetic field strength during charging in this project. The result shows that the magnetic field strength has dropped to 10 $\mu T$ at a distance of 12 cm above the coil of the receiving terminal, and it is evaluated that no adverse effect is generated on the positioning system, precision components and the like of the unmanned aerial vehicle.

A resonant magnetic coupling wireless power transmission system is composed of several feedback control circuits, which can ensure the stable operation of the system. In addition, because this technology transmits power in a near-field coupling manner, the charging equipment can be charged over obstacles during the transmission process, thereby ensuring the stability of charging.

In addition, wireless charging has low loss and low radiation, and the resonant magnetic coupling wireless power transmission technology has a charging efficiency higher than 80%, so the power loss is less than 20%. After a charging operation on a laboratory unmanned aerial vehicle prototype, data is recorded and analyzed. Within the energy loss less than 20%, only a small part is present in the form of radiation, and the energy radiated by this part is less than the energy radiated from a household induction cooker, therefore the radiation quantity of wireless charging is small, and the influence on various internal systems of the honeycomb is small. In order to ensure the long-term stability of wireless charging, the coils of the transmitting terminal and the receiving terminal are made of a magnetically conductive material with a strong magnetizing effect and a higher quality factor, and the quality factor is further greatly improved with the increase in the charging power, therefore, the radiated energy can be greatly reduced, and the safety performance can be improved.

The resonant magnetic coupling wireless power transmission technology is an efficient wireless energy transmission technology with an efficiency of up to 90% or more. The product integrates an intelligent endurance control unit and a magnetic coupling power transmission unit, adopts self-feedback transmitting power for adjustment and control, communicates with a battery management system of the unmanned aerial vehicle to obtain real-time parameters such as a battery state and operating information, and realizes the adaptive matching of energy supply of the magnetic coupling power transmission unit according to the requirements of the battery management system of the unmanned aerial vehicle, thereby replenishing the energy of the battery quickly and losslessly, and prolonging the service life of the battery life.

A temperature control device 64 and a dehumidification device 65 are further arranged inside the inner cabin 3.

Figure 5:
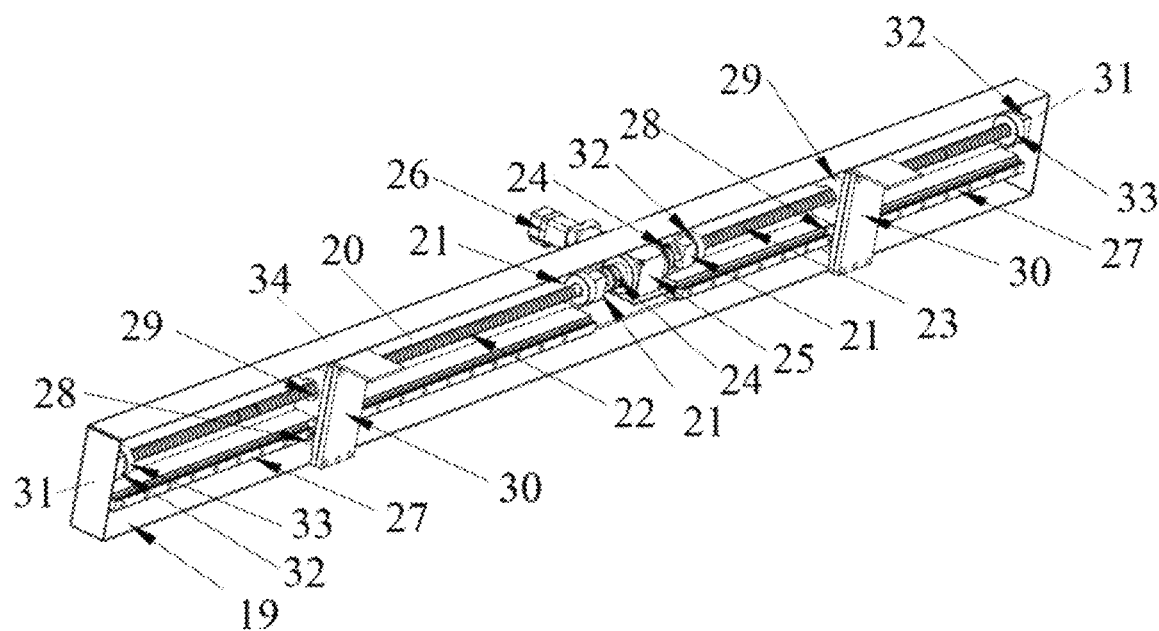
FIG. 5 is a schematic structural diagram of an X1 axis of the embodiments of the disclosure.
Figure 6:
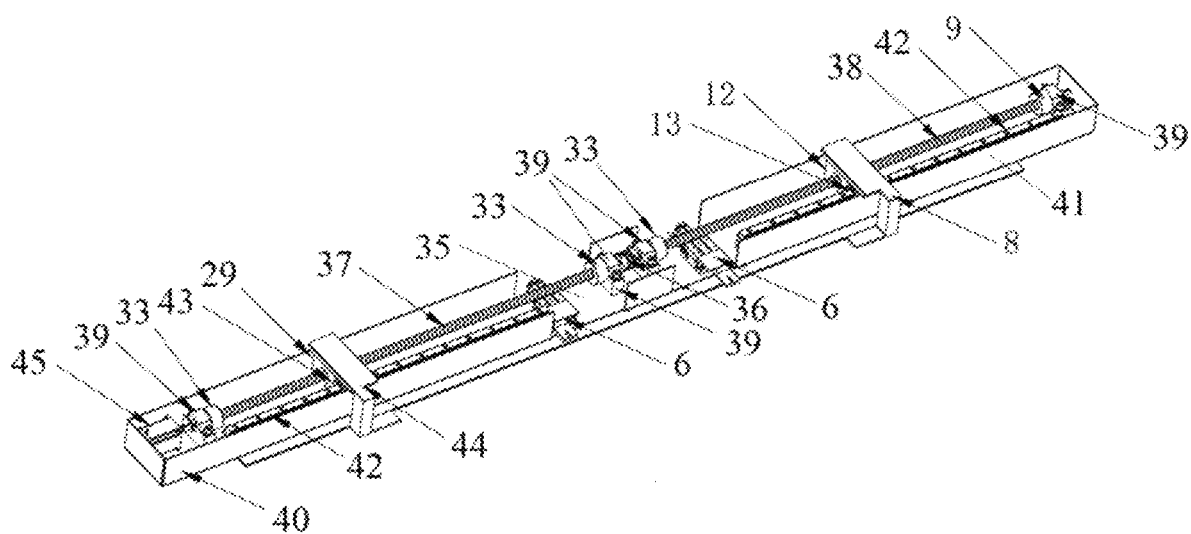
FIG. 6 is a schematic structural diagram of a Y1 axis of the embodiments of the disclosure.
Figure 7:
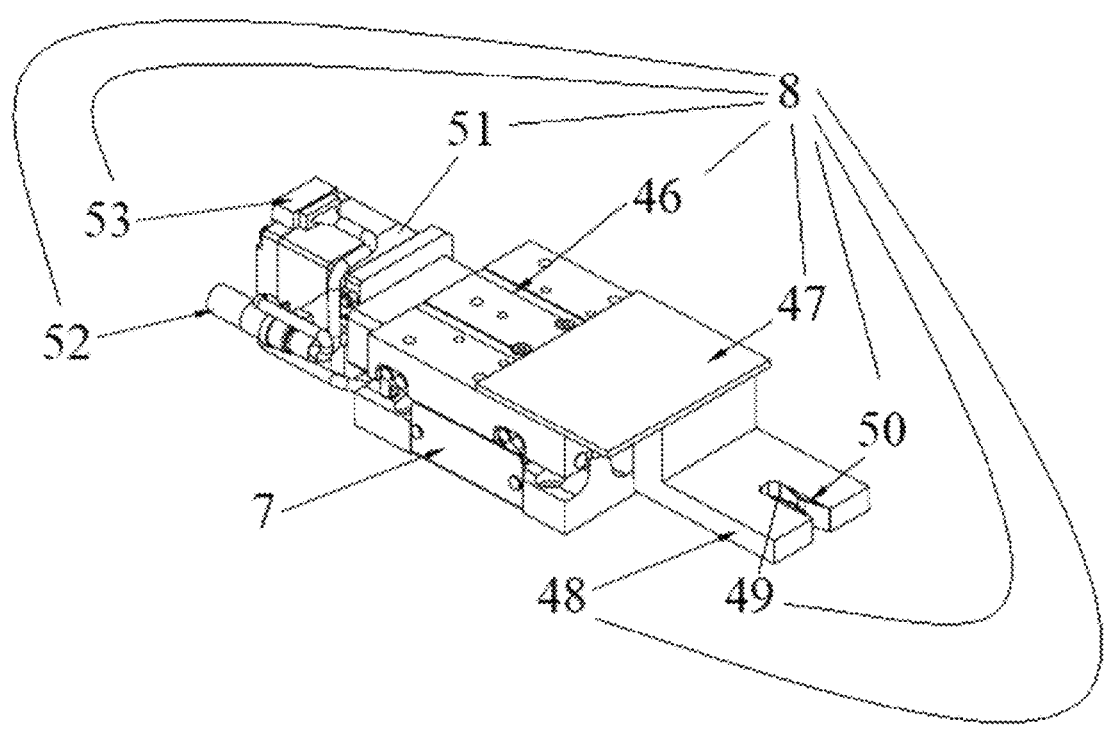
FIG. 7 is a schematic structural diagram of a locking and charging device of the embodiments of the disclosure.
Figure 8:
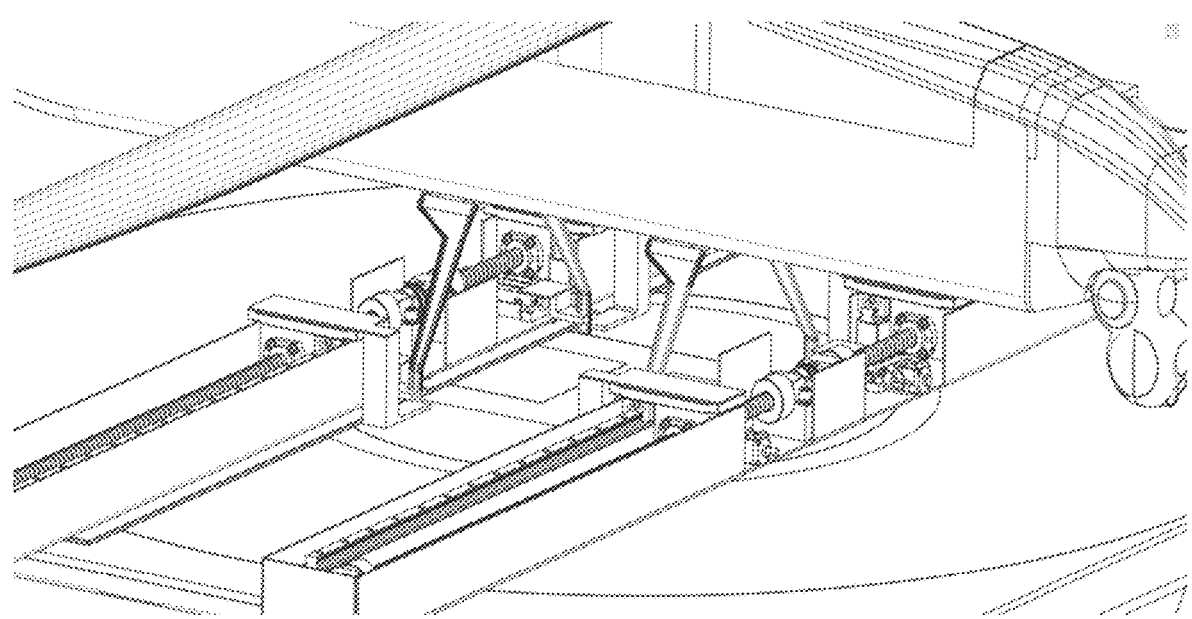
FIG. 8 is a schematic diagram of a use state of the locking and charging device of the embodiments of the disclosure.
Figure 9:
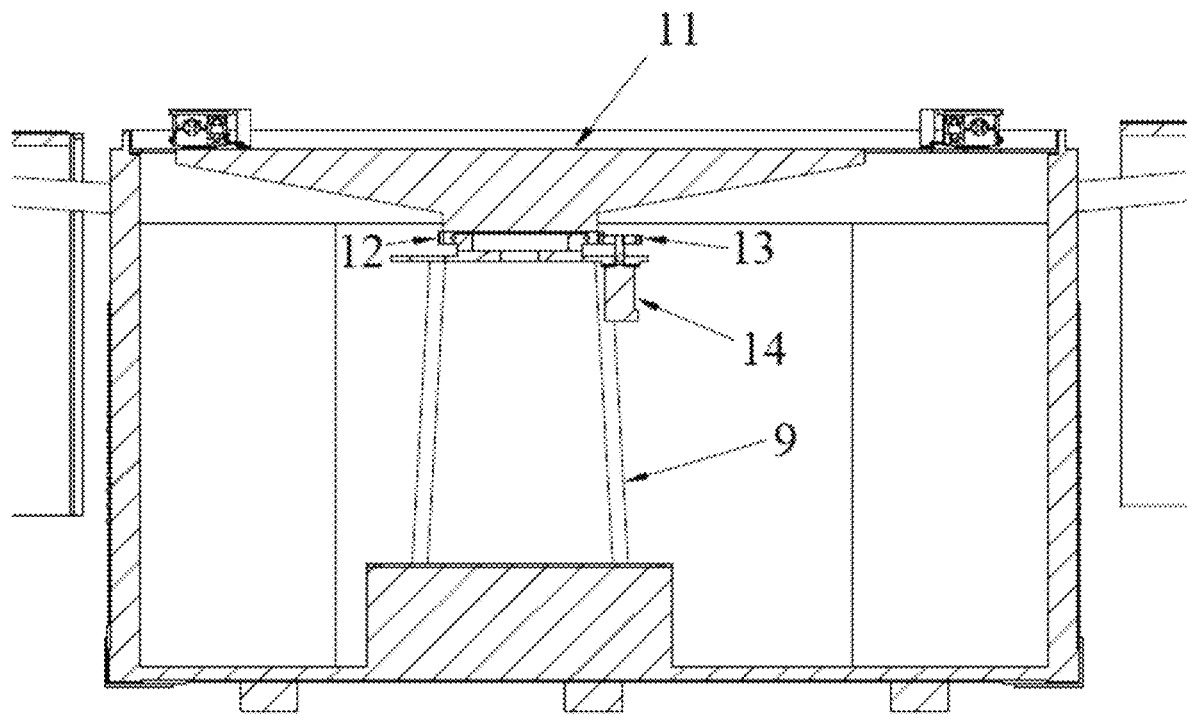
FIG. 9 is a schematic structural diagram of a rotating mechanism of the embodiments of the disclosure.
Figure 10:
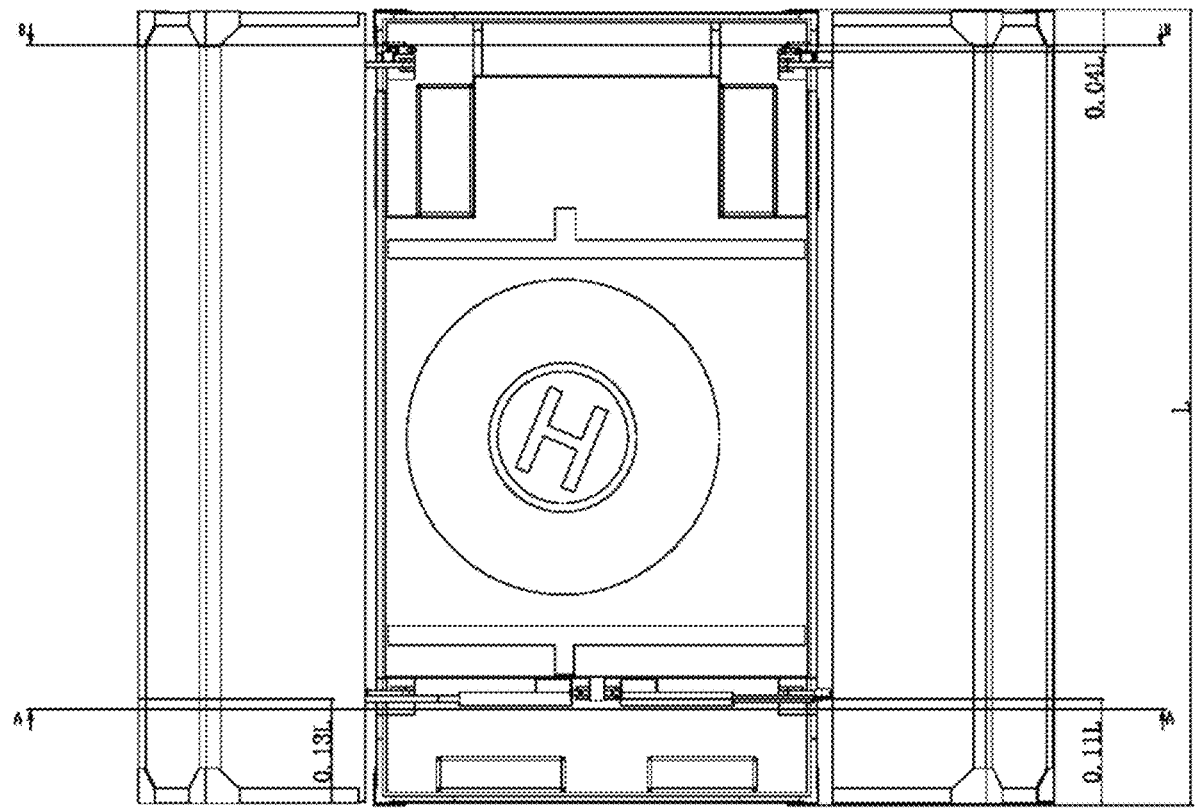
FIG. 10 is a schematic structural diagram of an open state of the top cover of the embodiments of the disclosure.
Figure 11:
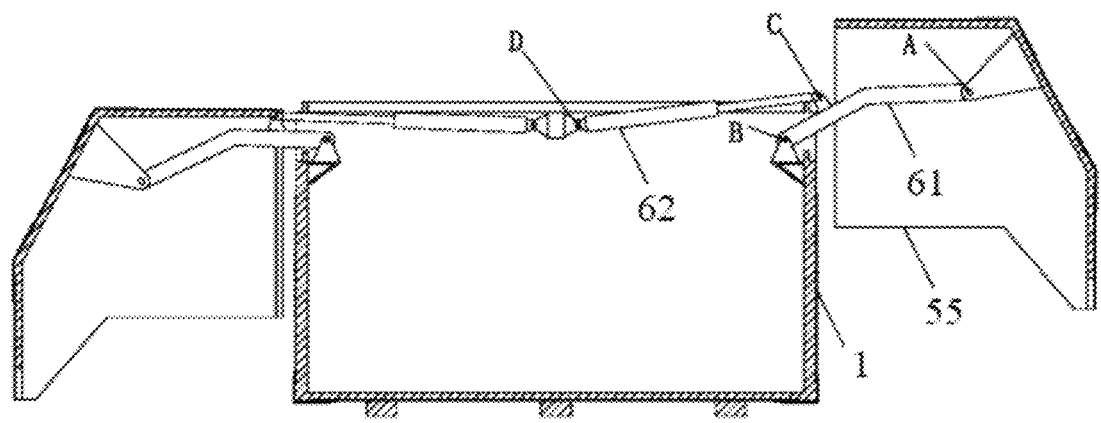
FIG. 11 is a schematic diagram I of a side view structure of the embodiments of the disclosure.
Figure 12:
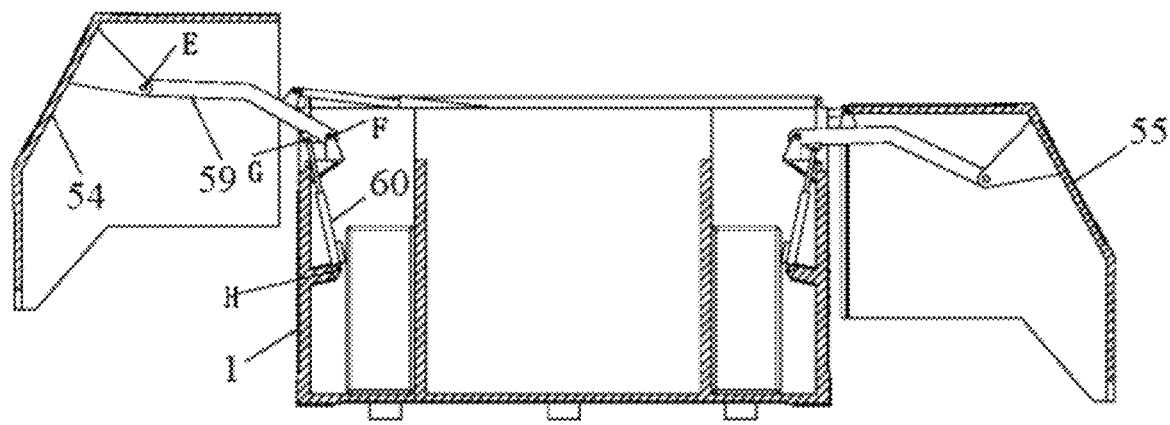
FIG. 12 is a schematic diagram II of the side view structure of the embodiments of the disclosure.
Figure 13:
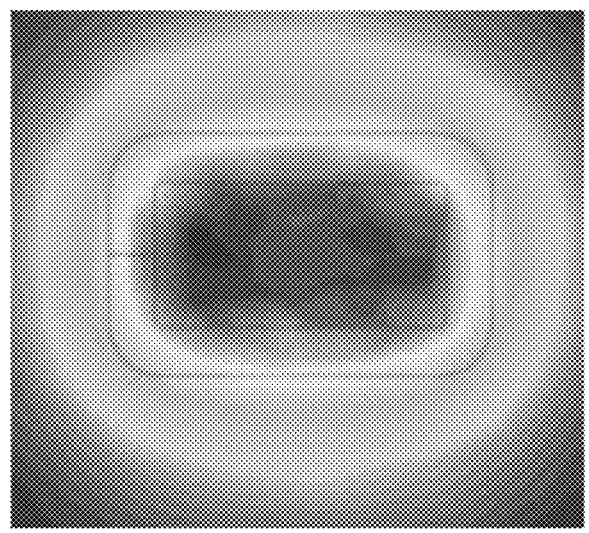
FIG. 13 is a schematic diagram of an initial magnetic field intensity of a coil of a receiving terminal of a wireless charging device of the embodiments of the disclosure.
Figure 14:
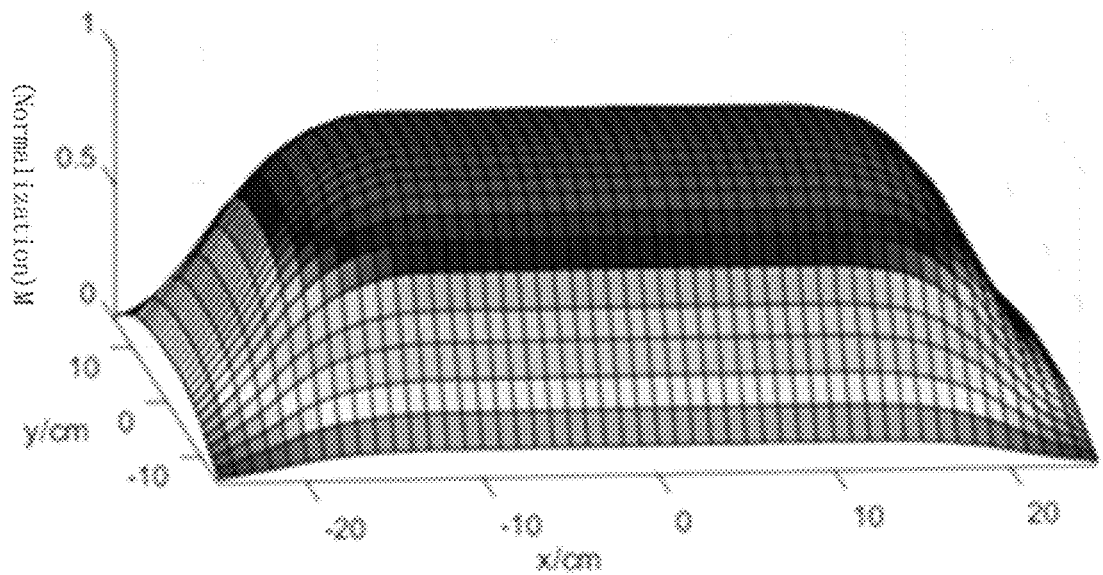
FIG. 14 is a schematic diagram of an influence of a relative position of the receiving terminal and a transmitting terminal on the mutual inductance of the embodiments of the disclosure.
Figure 15:
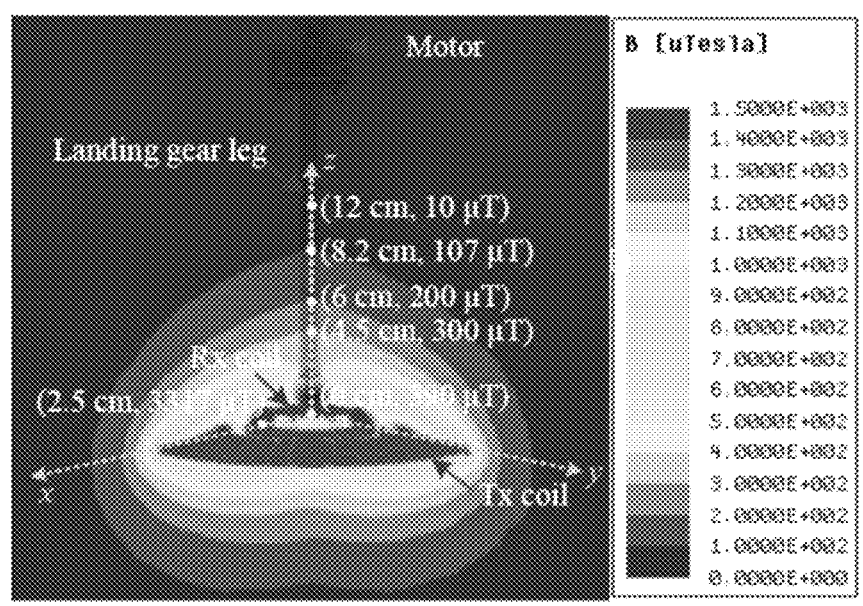
FIG. 15 is a simulation diagram of a magnetic field of the embodiments of the disclosure.
Figure 16:
FIG. 16 is a schematic diagram I of a landing process of the embodiments of the disclosure.
Figure 16:
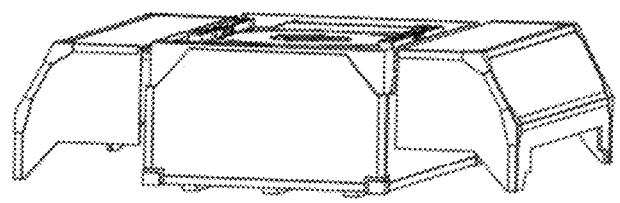
Figure 17:
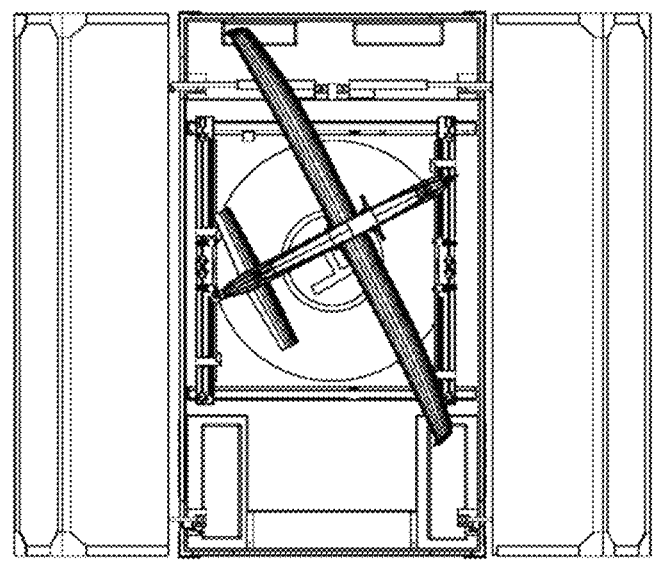
FIG. 17 is a schematic diagram II of the landing process of the embodiments of the disclosure.
Figure 18:
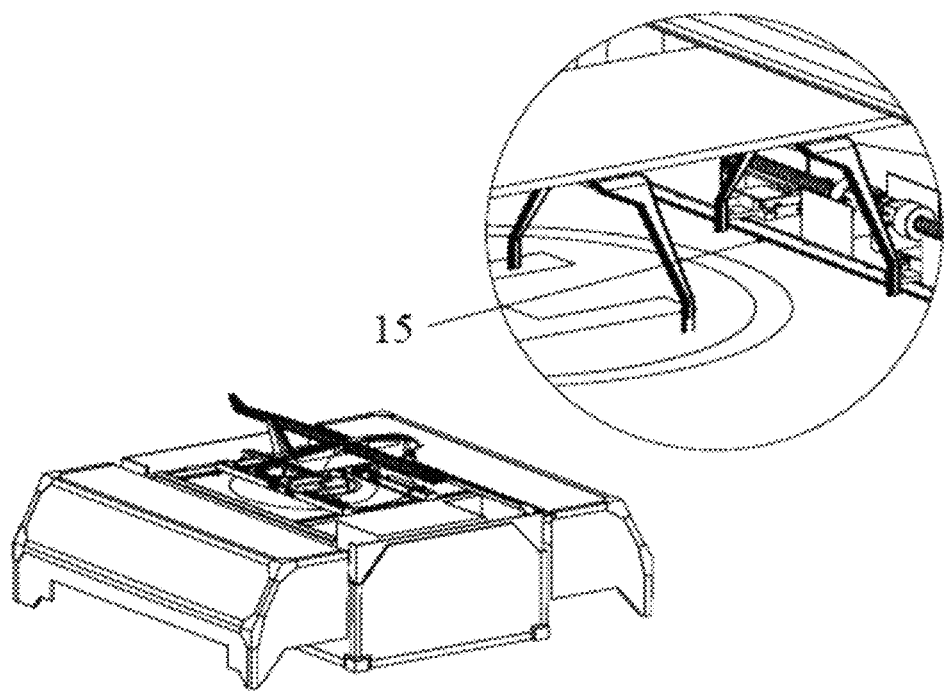
FIG. 18 is a schematic diagram III of the landing process of the embodiments of the disclosure.
Figure 19:
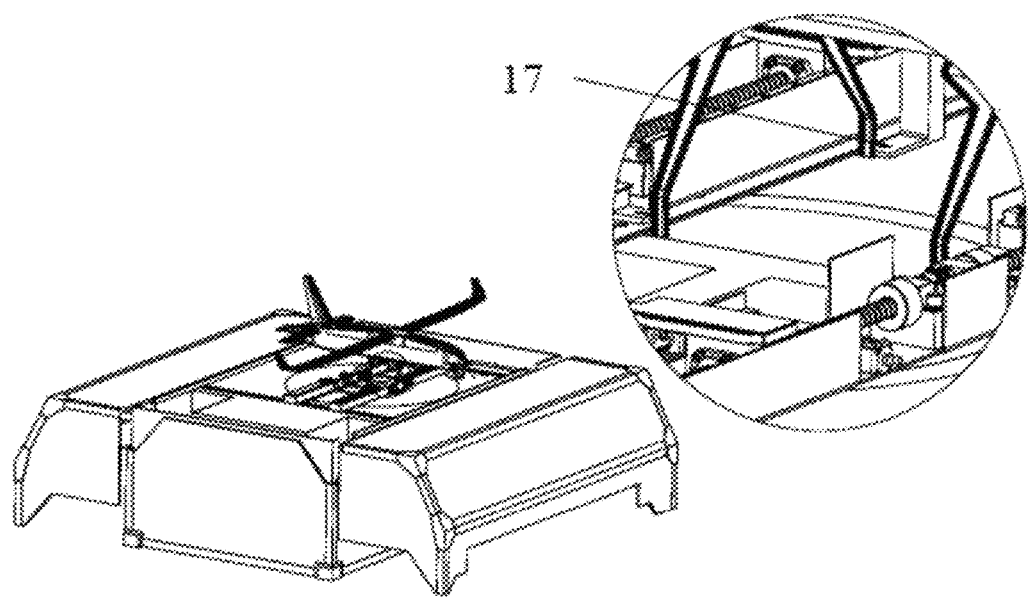
FIG. 19 is a schematic diagram IV of the landing process of the embodiments of the disclosure.
Figure 20:
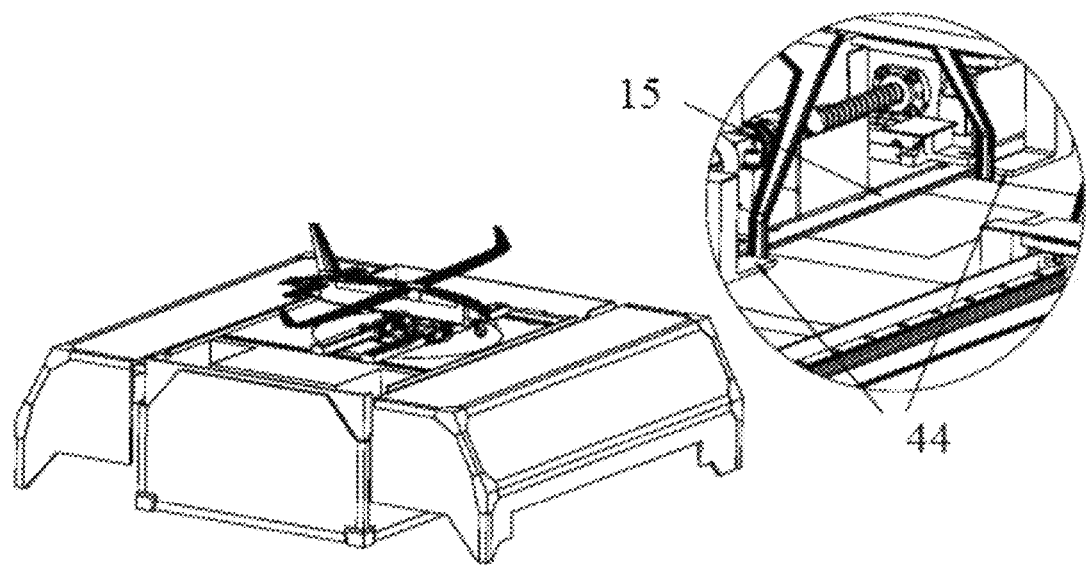
FIG. 20 is a schematic diagram VI of the landing process of the embodiments of the disclosure.
Figure 21:
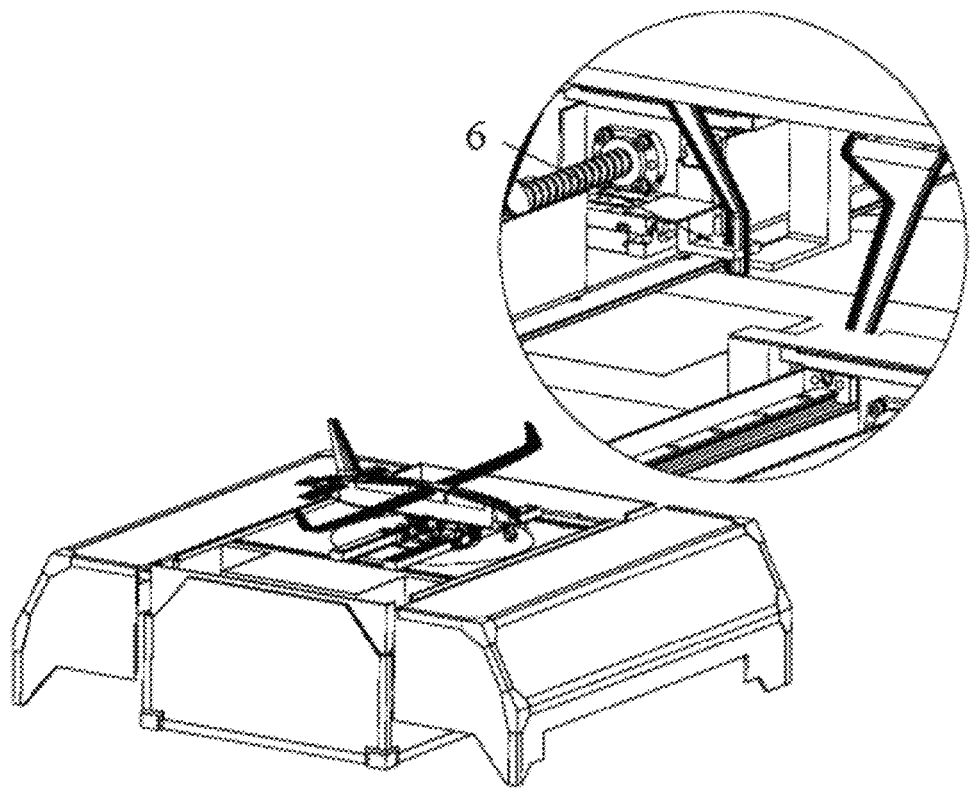
FIG. 21 is a schematic diagram VII of the landing process of the embodiments of the disclosure.
Figure 22:
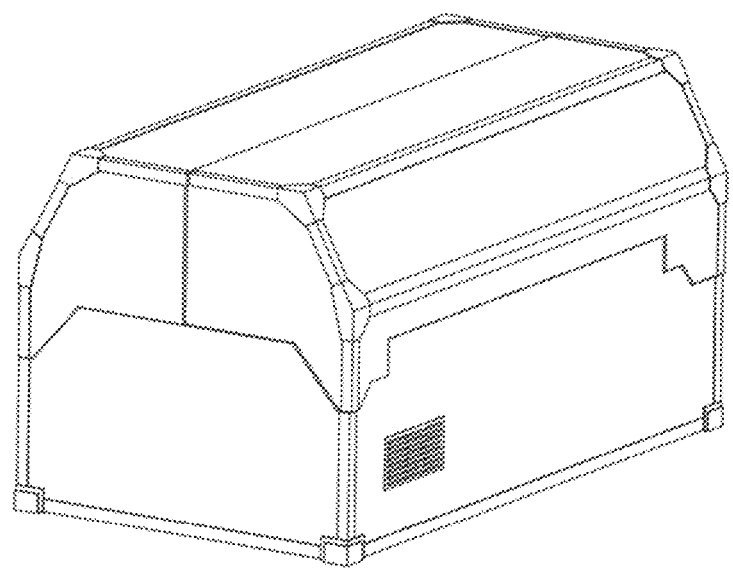
FIG. 22 is a schematic diagram VIII of the landing process of the embodiments of the disclosure; and the meanings of various mark numbers in the drawings: 1—cabin body, 2—top cover, 3—inner cabin, 4—rotating mechanism, 5—clamping and centering device, 6—locking and charging device, 7—base, 8—pneumatic hydraulic clamp for charging, 9—support frame, 10—mounting shaft, 11—rotating platform, 12—driven gear, 13—driving gear, 14—motor, 15—X1 axis, 16—X2 axis, 17—Y1 axis, 18—Y2 axis, 19—X axis guide rail mounting plate, 20—first lead screw mounting plate, 21—first X axis supporting seat, 22—first X axis lead screw, 23—second X axis lead screw, 24—X axis coupling, 25—right-angle commutator, 26—X axis motor, 27—X axis guide rail, 28—X axis slide block, 29—nut, 30—Y axis connecting device, 31—end plate, 32—second X axis supporting seat, 33—limit switch, 34—dust guard plate, 35—second lead screw connecting plate, 36—Y axis coupling, 37—first Y axis lead screw, 38—second Y axis lead screw, 39—Y axis supporting seat, 40—first Y axis guide rail mounting plate, 41—second Y axis guide rail mounting plate, 42—Y axis guide rail, 43—Y axis slide block, 44—push plate, 45—Y axis motor, 46—guide block, 47—first connecting plate, 48—charging panel, 49—charging groove, 50—charging elastic sheet, 51—power block, 52—electrical interface, 53—pneumatic interface, 54—first top cover, 55—second top cover, 56—connecting mechanism, 57—first connecting mechanism, 58—second connecting mechanism, 59—connecting rod 2, 60—electric push rod 2, 61—connecting rod 1, 62—electric push rod 1, 63—wireless charging transmitting terminal, 64—temperature control device, and 65—dehumidification device.

A dual-air-conditioner temperature adjustment system is used for adjusting the indoor temperature inside the nest, the air conditioner has an independent external unit chamber, an external unit is connected with the inside of the nest through a pipeline, the joint is sealed to prevent temperature transmission, the external unit chamber is equipped with window shades, internal and external air circulation is realize via the window shades, when the external temperature is too high/low, a cooling/heating mode of the air conditioner is turned on to ensure that the equipment in the nest works at a suitable temperature, thereby reducing the risk of high-temperature operation of the equipment and increasing the service life of the equipment, as shown in FIG. 5.

Moisture-proof: a small dehumidifier is installed in a bottom edge space of the nest, and when the air humidity reaches a certain value, the dehumidifier will automatically start dehumidifying.

The workflow of the embodiments of the disclosure is as follows:

The workflow of the fully automatic intelligent nest of the unmanned aerial vehicle is as follows:

A) The nest adopts unmanned automatic control and remote monitoring, all operations are automatically completed by the interaction between the nest and the unmanned aerial vehicle, and special operations are completed under the monitoring and control of an upper computer control room;

B) the unmanned aerial vehicle flies to a landing area, the nest receives a nest entering instruction and sends a control command to drive the electric push rod to open the top cover of the nest, and when the top cover is in place, it touches a travel switch and stops; then the rotating platform starts rotating, and the baseline angle of which is kept consistent with the landing angle direction of the unmanned aerial vehicle with a deviation not greater than 5 degrees, so as to wait to receive the unmanned aerial vehicle;

C) after the unmanned aerial vehicle falls on the parking rotating platform, the platform is driven to starting rotating by the stepper motor, and the positioning angle of the unmanned aerial vehicle is set to zero. Then, the clamping mechanism clamps the X axis at first under the control of the stepper motor, and clamps the Y axis after the unmanned aerial vehicle is positioned on a center line of the X axis, the unmanned aerial vehicle automatically stops at the center of the rotating platform by means of the horizontal push and positioning of the X/Y axis, in this way, it is ensured that the unmanned aerial vehicle is aligned with a fixed position on the platform. Machine legs can be automatically fixed and locked by the Y axis clamping mechanism;

D) then the electric push rod is driven to close the top cover through the control command, and after the top cover is in place, the travel switch stops for protection. Then, the Y axis push plate of the clamping mechanism returns to the original position (the fixation of the machine legs is unlocked), and then the X axis push plate returns to the original position;

E) an environmental control system starts working, and sends a control command to perform drying and dehumidification at first, and then adjusts to a set room temperature according to the ambient temperature;

F) thereafter, wireless charging and wireless static detection of the unmanned aerial vehicle are started. If there is a problem with wireless charging, the Y/X axis of the clamping mechanism clamps the unmanned aerial vehicle and fixes the machine legs, and wired charging is performed through the machine legs until the battery on the unmanned aerial vehicle is fully charged; and G) after receiving a departure instruction, the nest starts a departure state of the unmanned aerial vehicle and exits the charging and static detection state, the nest opens the top cover, the Y axis of the clamping mechanism returns to the original position (the fixation of the machine legs is unlocked), then the X axis returns to the original position, the rotating platform rotates to the handpiece windward direction of the unmanned aerial vehicle, the unmanned aerial vehicle takes off, then the nest closes the top cover, the rotating platform rotates to the zero position, and the nest turns into a state of waiting to receive the unmanned aerial vehicle.

Compared with the prior art, the embodiments of the disclosure have the following technical effects:

(I) The nest of the embodiments of the disclosure can realize automatic folding and unfolding, automatic charging, unattended and data uploading. Remote real-time monitoring is realized, an automatic mode can be canceled, manual remote operation is realized, and the nest is compatible with vertical take-off and landing unmanned aerial vehicles and multi-rotor unmanned aerial vehicles.

(II) The accuracy of centering and alignment in the embodiments of the disclosure is to design the size of a landing platform in accordance with statistical data, and leave a certain margin. A receiving platform and a flip mechanism are installed on a metal structural part to ensure the accuracy and rigidity. The top cover is in the shape of a half-space, which has a relatively low wind resistance coefficient, the surface and a covering edge are covered with softness, so that the sealing performance is good after the cover is closed, and it also protects the unmanned aerial vehicle from an accidental collision.

(III) The embodiments of the disclosure is simple in structure and convenient in construction, such that manpower and material resources can be greatly reduced.

The serial numbers of the foregoing embodiments of the disclosure are for description only, and do not represent the superiority or inferiority of the embodiments.

In the above-mentioned embodiments of the disclosure, the description of each embodiment has its own focus. For parts that are not described in detail in a certain embodiment, reference may be made to related descriptions of other embodiments.

In the several embodiments provided by the disclosure, it should be understood that, the disclosed technical content can be implemented in other manners. The device embodiments described above are merely exemplary, for example, the division of the units can be a logic function division, other division manners can exist in practical implementation, for example, a plurality of units or components can be combined or integrated to another system, or some features can be omitted or not implemented. From another point of view, the displayed or discussed mutual coupling or direct coupling or communication connection can be indirect coupling or communication connection of units or modules through some interfaces, and can be in electrical or other forms.

The units described as separate components can be separated physically or not, components displayed as units can be physical units or not, namely, can be located in one place, or can be distributed on a plurality of units. A part or all of the units can be selected to implement the purpose of the solution in the present embodiment according to actual demands.

In addition, the functional units in the embodiments of the disclosure can be integrated in a processing unit, or the units singly exist physically, or two or more units are integrated in one unit. The above-mentioned integrated unit can be implemented in the form of hardware, and can also be implemented in the form of a software functional unit.

If the integrated unit is implemented in the form of a software functional unit and is sold or used as an independent product, it can be stored in a computer-readable storage medium. Based on this understanding, the technical solutions of the embodiments of the disclosure substantially, or the part contributing to the prior art, or all or a part of the technical solutions can be embodied in the form of a software product, the computer software product is stored in a storage medium, which includes a plurality of instructions enabling a computer equipment (can be a personnel computer, a server, or a network equipment or the like) to execute all or a part of the steps of the methods in the embodiments of the disclosure. The foregoing storage medium includes a variety of media capable of storing program codes, such as a USB disk, a read-only memory (ROM, Read-Only Memory), a random access memory (RAM, Random Access Memory), a mobile hard disk, a magnetic disk, an optical disk or the like.

The foregoing descriptions are merely specific embodiments of the the disclosure. It should be pointed out that, for those of ordinary skill in the art, without departing from the principle of the embodiments of the disclosure, several improvements and modifications can also be made, and these improvements and modifications should also be regarded as the protection scope of the embodiments of the disclosure.

INDUSTRIAL APPLICABILITY

The solution provided by the embodiment of the disclosure can be applied to the technical field of take-off and landing of unmanned aerial vehicles. In the embodiment of the disclosure, provided is an automatic recycling and charging nest for a vertical take-off and landing unmanned aerial vehicle, including a cabin body and an openable and closable top cover installed on the top of the cabin body, wherein an inner cabin is further installed in the cabin body, the height of the inner cabin is the same as that of the cabin body, a rotating mechanism is further arranged inside the inner cabin, a clamping and centering device is installed on the top of the inner cabin, and a locking and charging device is further installed on the clamping and centering device; and the locking and charging device includes a base connected with the clamping and centering device, and a pneumatic hydraulic clamp for charging connected to the base. Under an unattended condition, the technical effects of automatic recycling and automatic charging of the unmanned aerial vehicle, and automatic data uploading are achieved.

What is claimed is:

1. An automatic recycling and charging nest for a vertical take-off and landing unmanned aerial vehicle, comprising a cabin body (1) and an openable and closable top cover (2) installed on a top of the cabin body (1), wherein an inner cabin (3) is further installed in the cabin body (1), a height of the inner cabin (3) is the same as a height of the cabin body (1), a rotating mechanism (4) is further arranged inside the inner cabin (3), a clamping and centering device (5) is installed on a top of the inner cabin (3), and a locking and charging device (6) is further installed on the clamping and centering device (5); and the locking and charging device (6) comprises a base (7) connected with the clamping and centering device (5), and a pneumatic hydraulic clamp (8) for charging connected to the base (7);
the clamping and centering device (5) comprises an X1 axis (15) and an X2 axis (16), which are connected with a top plate of the inner cabin (3), and a Y1 axis (17) and a Y2 axis (18), which are connected with the X1 axis (15) and the X2 axis (16);
the X1 axis (15) and the X2 axis (16) are arranged in parallel on both sides of the rotating mechanism (4), and the Y1 axis (17) and the Y2 axis (16) are arranged in parallel on the X1 axis (15) and the X2 axis (16);
the X1 axis (15) comprises a first lead screw mounting plate (20), and an X axis guide rail mounting plate (19) vertically connected with one side of the first lead screw mounting plate (20) along a length direction, the X axis guide rail mounting plate (19) connects with the top plate of the inner cabin (3);
a first X axis lead screw (22) and a second X axis lead screw (23) are installed on the first lead screw mounting plate (20) through first X axis supporting seats (21), the first X axis lead screw (22) and the second X axis lead screw (23) are respectively connected with a right-angle commutator (25) installed on the first lead screw mounting plate (20) through X axis couplings (24), and an X axis motor (26) is connected to the right-angle commutator (25);
an X axis guide rail (27) is installed on the X axis guide rail mounting plate (19), and an X axis slide block (28) is installed on the X axis guide rail (27);
a rotation direction of the first X axis lead screw (22) is opposite to a rotation direction of the second X axis lead screw (23), Y axis connecting devices (30) are respectively connected to both the first X axis lead screw (22) and the second X axis lead screw (23) through nuts (29), and the Y axis connecting devices (30) are connected with the X axis slide block (28); and
the X2 axis (16) has the same structure as the X1 axis (15);
the Y1 axis (17) comprises a second lead screw connecting plate (35) connected with the Y axis connecting device (30), the middle of the second lead screw connecting plate (35) is connected with a Y axis coupling (36), the both ends of the Y axis coupling (36) are respectively connected with a first Y axis lead screw (37) and a second Y axis lead screw (38), and the first Y axis lead screw (37) and the second Y axis lead screw (38) are respectively connected with the second lead screw connecting plate (35) through Y axis supporting seats (39);
one side of the second lead screw connecting plate (35) along the length direction of the second lead screw connecting plate (35) is vertically connected with a first Y axis guide rail mounting plate (40) and a second Y axis guide rail mounting plate (41), Y axis guide rails (42) are respectively installed on the first Y axis guide rail mounting plate (40) and the second Y axis guide rail mounting plate (41), and Y axis slide blocks (43) are installed on the Y axis guide rails (42);
a rotation direction of the first Y axis lead screw (37) is opposite to a rotation direction of the second Y axis lead screw (38), push plates (44) are connected to both the first Y axis lead screw (37) and the second Y axis lead screw (38), the push plates (44) are connected with the Y axis slide blocks (43), an end of the first Y axis lead screw (37) is connected with the Y axis coupling (36), and another end of the first Y axis lead screw (37) is connected with a Y axis motor (45); and
the Y2 axis (18) has the same structure as the Y1 axis (17);
the locking and charging device (6) comprises a base (7) connected with the second lead screw connecting plate (35), and a pneumatic hydraulic clamp (8) for charging connected to the base (7);
the pneumatic hydraulic clamp (8) for charging comprises a guide block (46) connected to an upper surface of the base (7) and a first connecting plate (47) connected to the upper surface of the guide block (46), and the first connecting plate (47) has the ability to move on the upper surface of the guide block (46);
one end of the first connecting plate (47) stretches out from the upper surface of the guide block (46), an end of the first connecting plate (47) stretching out from the guide block (46) is further connected with a charging panel (48), one end of the charging panel (48) back to the guide block (46) is provided with a charging groove (49), and a charging elastic sheet (50) is arranged inside the charging groove (49); and
a power block (51) is further connected to the base (7), an electrical interface (52) and a pneumatic interface (53) are arranged on the power block (51), the electrical interface (52) is configured to supply power to the charging elastic sheet (50), and the pneumatic interface (53) is configured to supply energy to the first connecting plate (47).

2. The automatic recycling and charging nest for the vertical take-off and landing unmanned aerial vehicle as claimed in claim 1, wherein the rotating mechanism (4) comprises a support frame (9) installed on a bottom plate of the inner cabin (3), and a rotating platform (11) connected with the support frame (9) through a mounting shaft (10); and a driven gear (12) is sleeved on the mounting shaft (10), the driven gear (12) is engaged with a driving gear (13), and the driving gear (13) is connected with a motor (14).

3. The automatic recycling and charging nest for the vertical take-off and landing unmanned aerial vehicle as claimed in claim 1, wherein a top plate of the inner cabin (3) is open, and a surface of the rotating platform (11) is flush with the top plate of the inner cabin (3).

4. The automatic recycling and charging nest for the vertical take-off and landing unmanned aerial vehicle as claimed in claim 1, wherein both ends of the X axis guide rail mounting plate (19) in the length direction are further vertically connected with end plates (31), and second X axis supporting seats (32) are installed on the end plates (31);

limit switches (33) are respectively installed on the ends of the first X axis lead screw (22) and the second X axis lead screw (23) away from the X axis couplings (24); and the other side of the first lead screw mounting plate (20) along the length direction is further vertically connected with a dust guard plate (34).

5. The automatic recycling and charging nest for the vertical take-off and landing unmanned aerial vehicle as claimed in claim 1, wherein a pair of pneumatic hydraulic clamps (8) for charging is respectively arranged on the Y2 axis (18) and the Y1 axis (17), and the distance between the pair of pneumatic hydraulic clamps (8) for charging is determined according to the distance between a landing gear of the unmanned aerial vehicle.

6. The automatic recycling and charging nest for the vertical take-off and landing unmanned aerial vehicle as claimed in claim 1, wherein the top cover (2) comprises a first top cover (54) and a second top cover (55) that are covered on the top of the cabin body (1), the first top cover (54) and the second top cover (55) are respectively connected with the cabin body (1) through a connecting mechanism (56), the connecting mechanism (56) comprises a first connecting mechanism (57) for connecting the first top cover (54) with the cabin body (1), and a second connecting mechanism (58) for connecting the second top cover (55) with the cabin body (1);

the first connecting mechanism (57) comprises a connecting rod 2 (59) hinged on a side wall of the cabin body (1) in the length direction and an electric push rod 2 (60) hinged with the connecting rod 2 (59), another end of the electric push rod 2 (60) is hinged with the side wall of the cabin body (1) in the length direction, and the connecting rod 2 (59) is L-shaped;

the first connecting mechanism (57) further comprises a connecting rod 1 (61) hinged on the side wall of the cabin body (1) in the length direction and an electric push rod 1 (62) hinged with the connecting rod 1 (61), another end of the electric push rod 1 (62) is hinged with the side wall of the inner cabin (3) facing the length direction of the cabin body (1), a height of a hinge point is the same as a height of the cabin body (1), and the connecting rod 1 (61) is L-shaped; and the structure of the second connecting mechanism (58) is the same as the structure of the first connecting mechanism (57).

7. The automatic recycling and charging nest for the vertical take-off and landing unmanned aerial vehicle as claimed in claim 2, wherein a wireless charging transmitting terminal (63) is further connected to the support frame (9), and the wireless charging transmitting terminal (63) is located directly below the rotating platform (11); and a temperature control device (64) and a dehumidification device (65) are further arranged inside the inner cabin (3).

* * * * *